(12) United States Patent
Fok et al.

(10) Patent No.: US 7,969,922 B2
(45) Date of Patent: Jun. 28, 2011

(54) APPARATUS AND METHODS FOR PROVIDING CONFIGURABLE TASK MANAGEMENT OF A WIRELESS DEVICE

(75) Inventors: Kenny Fok, San Diego, CA (US); Eric Chi Chung Yip, San Diego, CA (US); Mikhail A. Lushin, San Diego, CA (US); Jihyun Hwang, San Diego, CA (US); Carol Li-Chung Yang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 642 days.

(21) Appl. No.: 11/525,483

(22) Filed: Sep. 21, 2006

(65) Prior Publication Data

US 2007/0180089 A1 Aug. 2, 2007

Related U.S. Application Data

(60) Provisional application No. 60/763,994, filed on Jan. 31, 2006.

(51) Int. Cl.
*H04B 7/00* (2006.01)

(52) U.S. Cl. ........ 370/310; 370/328; 370/338; 709/220; 709/221; 709/222; 709/223

(58) Field of Classification Search .................. 370/310, 370/328, 338; 709/220–223
See application file for complete search history.

(56) References Cited

U.S. PATENT DOCUMENTS

| 5,918,004 | A | * | 6/1999 | Anderson et al. ............... 714/38 |
| 7,331,019 | B2 | * | 2/2008 | Ananth et al. ................. 715/771 |
| 2004/0152362 | A1 | | 8/2004 | Carter |
| 2005/0113029 | A1 | * | 5/2005 | Koivukangas et al. .... 455/67.11 |

FOREIGN PATENT DOCUMENTS

| EP | 1309214 A1 | 5/2003 |
| WO | 2004004381 A1 | 1/2004 |

* cited by examiner

*Primary Examiner* — Wayne Cai
(74) *Attorney, Agent, or Firm* — James T. Hagler

(57) ABSTRACT

Methods, devices, computer readable media and apparatus are presented for providing configurable task management, such as data collection management, on a wireless device. Task management provides conditions and associated actions which may be dynamically configured and implemented in conjunction with any application executed on the wireless device.

44 Claims, 16 Drawing Sheets

100
APPARATUS AND METHODS FOR PROVIDING CONFIGURABLE TASK MANAGEMENT OF A WIRELESS DEVICE

CLAIM OF PRIORITY UNDER 35 U.S.C. §119

The present Application for Patent claims priority to Provisional Application No. 60/763,994 entitled "MobileView Dynamic Mechanism for Configuring Data Collection on Device" filed Jan. 31, 2006, and assigned to the assignee hereof and hereby expressly incorporated by reference herein.

BACKGROUND

The described embodiments generally relate to wireless communications devices and computer networks. More particularly, the described aspects relate to the remote configuration of executable tasks, such as data collection, on a wireless device.

Wireless networking connects one or more wireless devices to other computer devices without a direct connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network The current trend in the wireless communication device industry is to market devices that have a wide range of functionality. For example, a single wireless communication device may be capable of wireless telephone communication, digital photography, wireless Internet communication, electronic mail (email) and/or Short Message Service (SMS) communication, wireless audio and/or video downloading, other wireless network service communications and the like. In addition, the wireless communication device may be capable of storing or wirelessly accessing numerous applications that can then be executed on the wireless communication device.

As the functionality of these devices expands, the device users increasingly demand high performance and reliability. To insure such high performance and reliability, applications are being implemented to monitor performance so that service providers, device manufacturers and the like can respond to problems, or the potential providers, device manufacturers and the like can respond to problems, or the potential for problems, in a timely fashion. Most of these monitoring-type applications require data to be collected at the wireless device and, in many instances, communicated to a network device for subsequent performance analysis. For example, a wireless telephone may log data related to calls or may capture data when an event, such as a "call failure" or a "call drop" occurs.

Currently, applications that require data collection at the wireless device rely on the source code of the application to define what data is collected, how the data is collected and any other parameters related to data collection. Thus, if the user of the application desires to change what data is collected, how the data is collected or any other related parameter, the user must modify the source code and update the applications being implemented on the wireless devices. This becomes a cause for concern because in many of these monitoring-type applications the user will readily desire to make data collection changes based on the monitored performance of the device or the wireless network. In many instances, such as when a service provider is attempting to identify a problem within a device or the network, changes in data collection need to be implemented dynamically, on-the-fly, in order for the service provider to address the problem, or the potential for a problem, in a timely fashion.

As previously noted, the functionality in a wireless device is diverse and, as such, the collectable data may vary from device to device. In this instance, current monitoring-type applications may need to be device-specific in terms of collection code to accommodate the variance in device functionality. Additionally, the computing capability of wireless devices means that the applications and functionality can readily be added and/or removed from the device. As such, devices may be capable of collecting additional, "new" data or, conceivably, may no longer possess the capability of collecting previously stored data. In this instance, monitoring-type applications may require modification of the source code to be able to collect "new" data or modifications to the source code to insure application functionality if previous data is no longer available.

Thus, a need exists to develop a data collection system that provides for dynamic configuration of data collection commands. In this regard, configurable data collection will allow the user to change what data is collected, how data is collected or other data collection related parameters without having to modify the source code of the application that requires data collection. Such a system will provide application users the ability to change data collection on the wireless device dynamically, as dictated by network performance, device performance or the like. Additionally, such a system will allow the application users the ability to tailor data collection based on the data collection functionality of specific wireless devices or the applications currently be executed on the wireless device.

SUMMARY

The present methods, apparatus, device, computer readable media and processors provide for configurable task management, such as data collection, on a wireless device. By providing for dynamically configurable task management, the need to modify or otherwise change task-related source code in an associated task-performing application or in any other application requiring wireless device data is no longer required. Such dynamically configurable task management allows a service provider or other user to efficiently and dynamically change what tasks are performed, how the task is performed and any other parameters related to the execution of the task.

In one aspect, a method for configurable data collection at a wireless communication device is defined. The method comprises receiving a task configuration message including at least one condition operable to occur on the wireless communication device and at least one corresponding action identifier operable to map at least one action specified in the message to the respective condition and performing each action referenced by each action identifier corresponding to each condition based on detecting the respective condition. In one aspect performing each action will include collecting predetermined data from a processing subsystem of the wireless communication device based on an action parameter corresponding to the action identifier. In such aspects, the corresponding condition may include a triggering event, a constant event or the like. The collection event may include collecting data from a predetermined log location, collecting event data from an event occurring at the wireless communication device, a data packet request event, or the like. In other aspects, the actions performed may include disabling the device, disabling a device component, providing for limited device use, executing an application on the device, executing a component on the device or the like. The method may further include referencing an action list received from the task configuration message based on the at least one action identifier, identifying each action from a plurality of actions in the action list corresponding to each respective condition based on each corresponding action identifier, and monitoring for the occurrence of each condition. In some aspects the condition and action may include further parameters that further define the condition and the associated action or actions.

A further related aspect is defined by a computer-readable medium for collecting data at a wireless communication device. The medium includes instructions stored thereon comprising a first set of instructions for receiving a task configuration message including at least one condition operable to occur on the wireless communication device and at least one corresponding action identifier operable to map at least one action specified in the message to the respective condition and a second set of instructions for performing each action referenced by each action identifier corresponding to each condition based on detecting the respective condition. Another related aspect is defined by a processor device, implemented in a wireless communication device, and configured to perform the operations of receiving a task configuration message including at least one condition operable to occur on the wireless communication device and at least one corresponding action identifier operable to map at least one action specified in the message to the respective condition and performing each action referenced by each action identifier corresponding to each condition based on detecting the respective condition.

Further, an aspect provides for a wireless communication device adapted to perform configurable tasks. The device comprises a communications module operable to receive a task configuration message comprising at least one condition operable to occur on the wireless communication device and at least one corresponding action identifier operable to map at least one action specified in the message to the respective condition. The device further comprises a task module in communication with the communications module and operable to perform each action referenced by each action identifier corresponding to each condition based on detecting the respective condition.

In yet another aspect, a method for data collection configuration at a network device is defined. The method includes selecting one or more conditions operable to occur at a wireless communication device and at least one action associated with each condition, generating a task configuration message comprising the selected conditions and at least one corresponding action identifier operable to map at least one action specified in the message to the respective condition and communicating the task configuration message to one or more wireless devices, wherein at least one wireless device is operable to receive the task configuration message and perform each action referenced by each action identifier corresponding to each condition based on detecting the respective condition.

A further related aspect is defined by a computer-readable medium for collecting data at a wireless communication device. The medium includes instructions stored thereon comprising a first set of instructions for selecting one or more conditions operable to occur at a wireless communication device and at least one action associated with each condition, a second set of instructions for generating a task configuration message comprising the selected conditions and at least one corresponding action identifier operable to map at least one action specified in the message to the respective condition and a third set of instructions for communicating the task configuration message to one or more wireless devices. The wireless device receives the task configuration message and performs each action referenced by each action identifier corresponding to each condition based on detecting the respective condition.

Another related aspect is defined by a processor device, implemented in a wireless communication device, and configured to perform the operations of selecting one or more conditions operable to occur at a wireless communication device and at least one action associated with each condition, generating a task configuration message comprising the selected conditions and at least one corresponding action identifier operable to map at least one action specified in the message to the respective condition and communicating the task configuration message to one or more wireless devices.

A further aspect provides a network device for configuring data collection on a wireless device. The network device includes a task configuration module operable to receive identification of at least one condition operable to occur on a wireless communication device and at least one action associated with each condition. Further, the task configuration module is operable to generate a task configuration message comprising the at least one condition, the corresponding at least one action, and at least one action identifier associated with the at least one condition, wherein each action identifier is operable to map the respective action to the respective at least one condition specified in the message. Additionally, the network device includes a communications module operable to communicate the task configuration message to one or more wireless devices.

Thus, the aspects herein described provide for dynamically configurable task management, such as data collection, at a wireless device. By providing for dynamically configurable task management, a service provider or the like can modify what tasks are performed, how the task is performed or any other parameter related to execution of a task on the wireless device without having to modify the source code of an associated task-related application or any other application requiring wireless device data. The aspects herein disclosed provide for configuration to occur dynamically as dictated by the performance of the device, applications or functions related to the device, the wireless network or the like.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors, however, may be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

Figure 1:
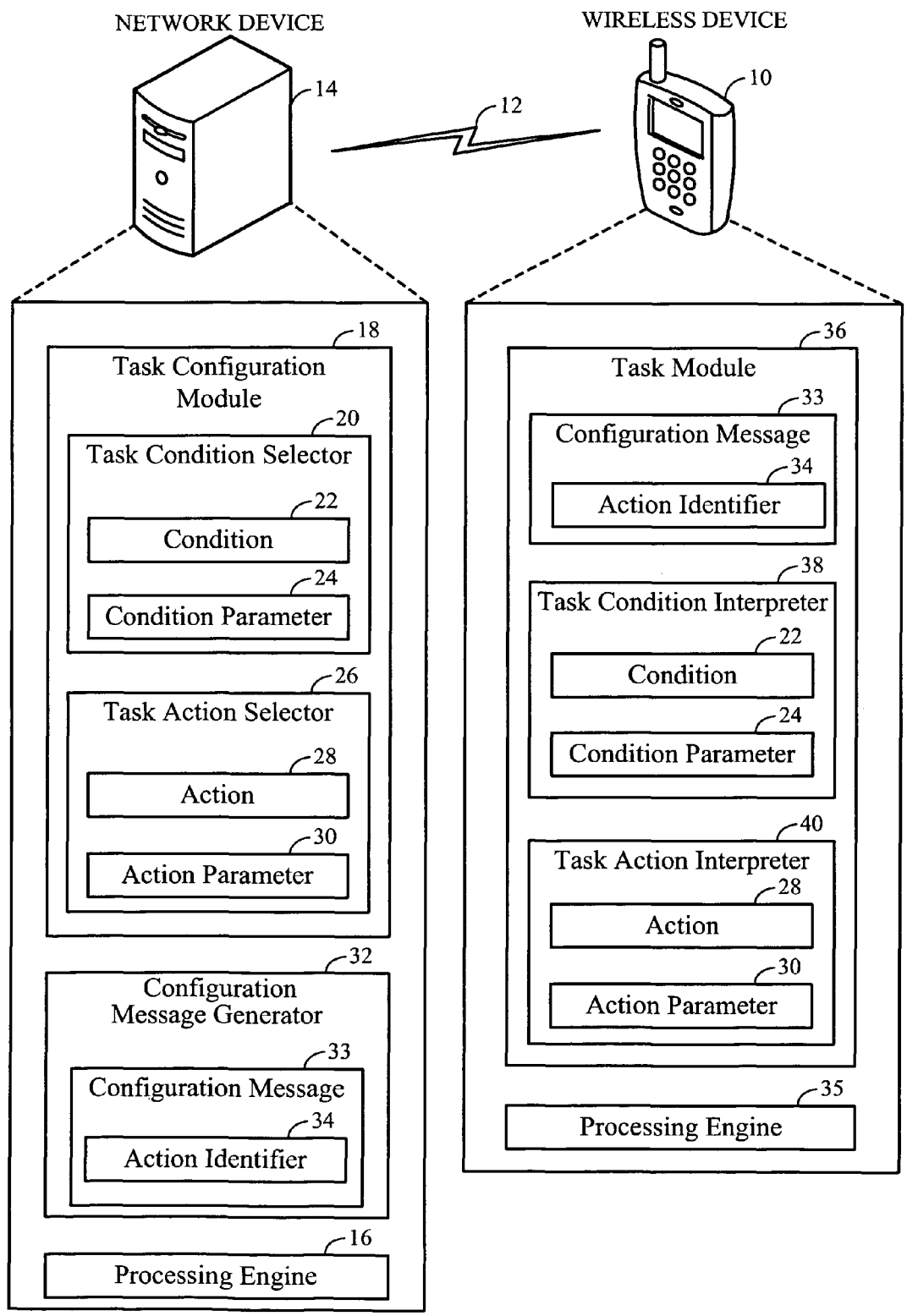
FIG. 1 is a schematic diagram of an apparatus for providing configurable data collection at a wireless device; according to one aspect.

According to one aspect, FIG. 1 provides a schematic diagram representation of a system for providing dynamically configurable data collection at a wireless device. The system includes one or more wireless devices 10 that are in wireless communication, via wireless network 12, with a network device 14, such as a user manager server.

The network device 14 includes a processing engine 16 that is operable to execute a task configuration module 18, which is operable to generate a message operable to cause a wireless device to perform a predetermined task. A task is herein defined as the combination of the performance of one or more predetermined actions based on the meeting or occurrence of one or more predetermined conditions. The task configuration module 18 may include a task condition selector 20 that is operable to provide a user with task condition selection options, or that is operable to allow a user to define a task condition. A task condition 22 identifies one or any combination of an event, state, log code, and data upon the occurrence or detection of which initiates the associated action. Further, a task condition may be defined in programming logic, such as a script, code or the like. For example, conditions may include, but are not limited to, a triggering event or combination of events, a constant condition or state, or any user-definable condition operable to occur on or be detectable by a wireless device. Examples of triggering events include, but are not limited to, the occurrence of predetermined events and/or log codes, the receipt of a packet payload matching a predetermined packet payload, "on" or "off" states for a device application or function, or the like. Examples of a constant condition include, but are not limited to, constant data collection of predetermined data, constant execution of a device application, constant execution of a device function or the like. The task condition selector 20 may also include condition parameters 24 that further define the data collection conditions.

The task configuration module 18 may include task action selector 26 that is operable to provide a user with action selection options, or allows a user to define an action. An action 28 is herein defined as the task, such as data collection, message generation, or any other function or operation on the device, which takes place upon the occurrence or detection of the associated condition or conditions. In the aspects in which the action involves data collection, examples include, but are not limited to, a predetermined log identifier collection action, a predetermined event identifier collection action, a packet request-and-response action and the like. The task selector 26 may also be operable for providing selection or definition of one or more action parameters 30 that further define the action.

The task configuration module 18 additionally may include configuration message generator 32 operable for generating a configuration message 33 (i.e., communication) based upon the selected conditions, actions and associated parameters. Additionally, the configuration message may implement action identifiers 34, such as numeric values or the like, that serve to associate a condition with one or more actions. Once the configuration message 33 has been generated it is communicated to the one or more wireless devices 10 and is operable to cause the performance of the one or more dynamically-configured actions based on the occurrence or detection of the one or more dynamically-configured conditions.

The wireless device 10 includes a processing engine 35 that is operable to execute a task module 36. The task module 36 may be initially downloaded to the wireless device from a service provider, such as customer care representative, from the network device 14 or from another network device. Alternatively, the task module may be pre-installed by the wireless device manufacturer or otherwise loaded onto the wireless device. The task module 36 may include a task condition interpreter 38 that is operable to determine, from received configuration message 33, conditions 22 to be monitored. In addition, the task condition interpreter 38 may be operable to determine, from received configuration message 33, condition parameters 24 associated with the conditions. Task module 36 is operable to apply the respective parameters to the respective condition to perform the desired monitoring activity. The task module 36 may further include a task action interpreter 40 that is operable to determine actions 28, associated with determined conditions 22, from received configuration messages 33. Task module 36 is thereby operable to monitor for the occurrence of the parsed condition 22 and to initiate the performance of the respective action 28 upon the occurrence of the detected condition. According to some aspects, the communication message 33 may include action identifiers 34, such as numeric values or the like, that serve to associate a condition 22 with one or more actions 28. In addition, the task action interpreter 40 may be operable to determine, from configuration message 33, action parameters 30 associated with an action and apply the parameters to the performance of the respective action.

Figure 2:
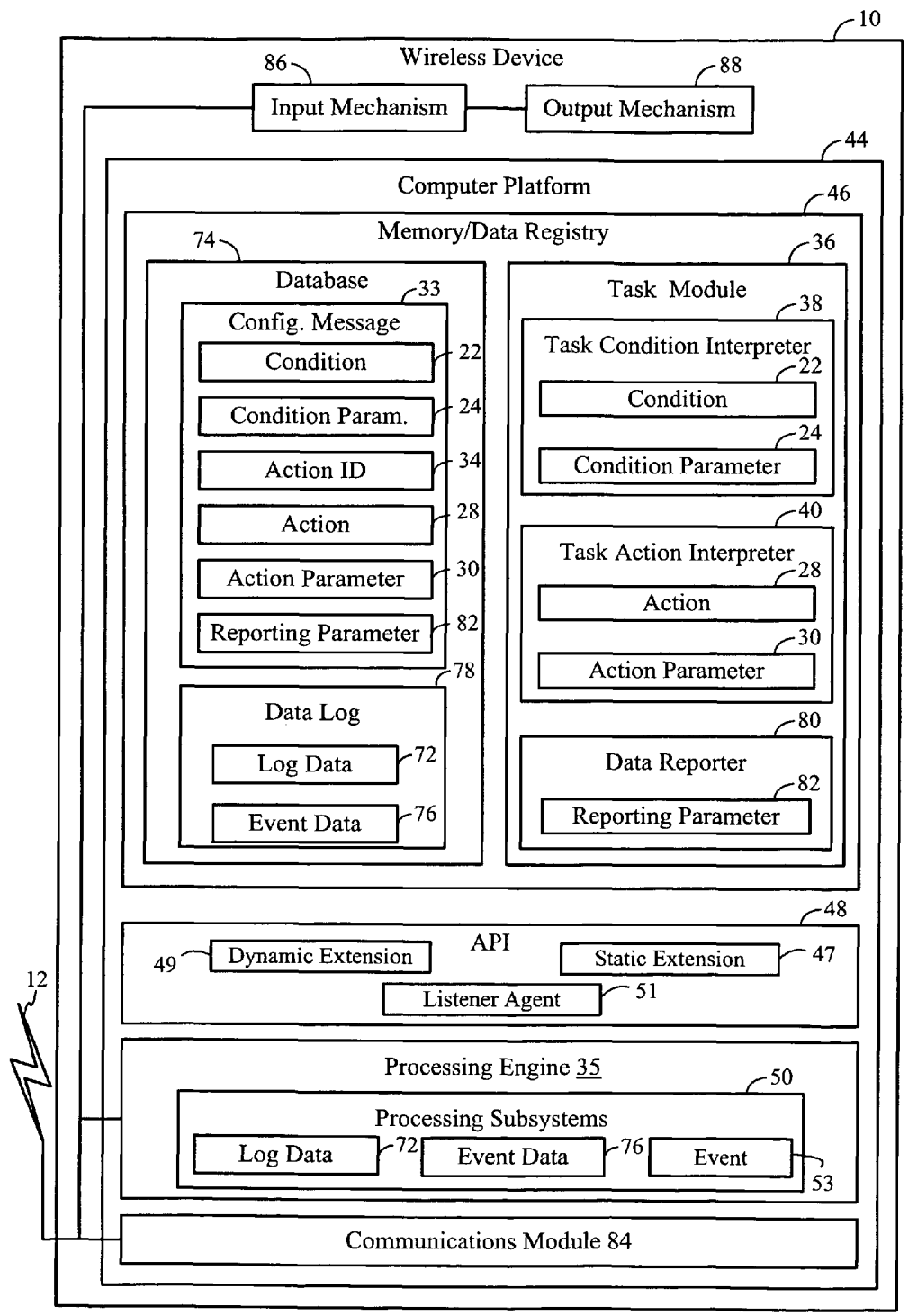
FIG. 2 is a block diagram of a wireless communication device that is operable for providing configurable data collection, according to one aspect.

Referring to FIG. 2, according to one aspect, a block diagram representation of a wireless communication device operable to provide configured data collection. The wireless device 10 may include any type of computerized, wireless device, such as cellular telephone, Personal Digital Assistant (PDA), two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 12, such as remote sensors, diagnostic tools, data relays, and the like. The apparatus and method for creating digitally signed licenses can accordingly be performed on any form of wireless device or computer module, including a wired or wireless communication portal, including without limitation, wireless modems, PCMCIA cards, access terminals, personal computers, telephones, or any combination or sub-combination thereof.

The wireless device 10 includes computer platform 44 that can transmit data across wireless network 12, and that can receive and execute routines and applications and optionally display data transmitted from network device 14, such as a user manager server or another computer device connected to wireless network 12. Computer platform 44 includes a memory and/or data registry 46, which may comprise volatile and nonvolatile memory such as read-only and/or random-access memory (RAM and ROM), EPROM, EEPROM, flash cards, or any memory common to computer platforms. Further, data registry 46 may include one or more flash memory cells, or may be any secondary or tertiary storage device, such as magnetic media, optical media, tape, or soft or hard disk.

Further, computer platform 44 also includes a processing engine 35, which may be an application-specific integrated circuit ("ASIC"), or other chipset, processor, logic circuit, or other data processing device. Processing engine 35 or other processor such as ASIC may execute an application programming interface ("API") layer 48 that interfaces with any resident programs, such as task module 36, stored in the data registry 46 of the wireless device 10. API 48 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

In some aspects, API 48 may include one or more static extensions 47 that provide an interface between programs operating on computer platform 44, such as task module 36, and the data and functionality of processing engine 35. Additionally, in some aspects, API 48 may further include one or more dynamic extensions 49 that provide an alternative and/or supplementary interface between programs operating on computer platform 44, such as task module 36, and the data and functionality of processing engine 35. In particular, dynamic extension 49 may add further functionality to static extension 47, and thus dynamic extension 49 may utilize extension 47 and then perform the additional functionality before providing data to a program operating on computer platform 44. Further, in some aspects, dynamic extension 49 may be associated with redundant code across a plurality of programs operating on computer platform 44, thus providing a common interface for redundant desired functionality, thereby saving wireless device resources, such as the memory needed to store such code.

Processing engine 35 includes various processing subsystems 50 embodied in hardware, firmware, software, and combinations thereof, that enable the functionality of wireless device 10 and the operability of the wireless device on wireless network 12. In one aspect, the task module 36 is capable of collecting data from any of the various subsystems 50 of the wireless device. For example, in one aspect, the processing engine 35 may include one or a combination of processing subsystems 50, such as: sound, non-volatile memory, file system, transmit, receive, searcher, physical layer, link layer, call processing layer, main control, remote procedure, music, audio, handset, power management, diagnostic, digital signal processor, vocoder, messaging, call manager, Bluetooth®, Bluetooth® Location-Position (LPOS), position determination, position engine, user interface, sleep, data services, security, authentication, USIM/SIM, voice services, graphics, USB, video services, camera/camcorder interface and associated display drivers, multimedia such as MPEG, GPRS, etc., along with other functionality applications. It should be noted that the subsystems could include any data or data service operable on a wireless device, which embody the device's operational functionality.

In one example in which the wireless device 10 is defined as a Code Division Multiple Access (CDMA) device the processing subsystems 50 may include, but are not limited to, one or more of a receive component for receiving communications sent to the processor of the wireless device, a call processing component and/or system determination component for handling the initiation, authentication, handoffs, data exchanges, messaging protocols, internal processing and decision-making, etc. associated with processing a message, and a transmit component for sending communications from the processor of the wireless device, such as to handset components, wireless network 12, wireless network components, and other devices connected to the wireless network. In the CDMA wireless device aspect, the call processing component may handle the majority of the call processing tasks, while system determination component may handle tasks relating to selecting an appropriate system, from a plurality of systems, with which to communicate, as well as higher-level decision-making tasks referenced by the call processing component. In addition, CDMA wireless device processing subsystems may further include one or more of a diagnostic component for evaluating a subsystem, a fax component for handling facsimile communications, a call manager component for characterizing and logging call types, a messaging component for text sending and receiving, and a data services component for processing all data-related communications, such as establishing and maintaining data calls. Additionally, processing subsystems may include a position-sensing component for determining the geographic position of the device, such as a Global Positioning System (GPS) or the like.

The data registry 46 of computer platform 44 includes task module 36. The task module 36 includes task condition interpreter 38 that is operable to determine, from received configuration messages 33, one or more conditions 22 and perform an action or actions according to the determined conditions.

As previously discussed, a task condition 22 identifies an event or state that is required for initiation of the action or actions. A task condition may be defined in programming logic, such as a script, code or the like. Task conditions 22 may include, but are not limited to, a triggering event, in which the occurrence of a specified event triggers an action, such as data collection or the like. For example, in one aspect, a packet payload match or mismatch, compared with a predetermined packet payload as identified by condition 22 and/or condition parameter 24, may serve as the triggering event for the collection of data. Another task condition 22 may include a constant condition, such as a constant data collection in which predetermined data is collected constantly (i.e., continuously), or constant executing of a device application or function is performed.

It should also be noted, and within the bounds of the currently described aspects, that programmable logic may be configured such that multiple task conditions must be met before the occurrence of an action or actions ensues. For example, in one aspect a first triggering event condition and a second triggering event condition are configured such that the first triggering must occur, followed by occurrence of the second triggering event before one or more predefined task action(s) occurs. In instances in which multiple conditions are configured, the conditions may be configured such that a task action or actions occur only if the conditions occur in a configured order (e.g. first triggering event condition followed by the second triggering event condition) or, alternatively, the conditions may be configured such that task action or actions occur once all the conditions occur, regardless of the order in which they occur.

In addition, the task condition interpreter 38 is operable to determine, from received configuration messages 33, any condition parameters 24 associated with the task conditions 22 and apply the parameters to the condition. Examples of condition parameters 24 will be described in detail infra., such as in relation to FIGS. 8-14.

The task module 36 additionally includes task action interpreter 40 that is operable to determine, from received configuration messages 33, actions 28 and to perform the action in accordance with the associated condition 22. In addition, the task action interpreter 40 may be operable to determine, from received configuration messages 33, action parameters 30 associated with the actions 28 and apply the action parameters 30 to the actions.

In some aspects, action 28 may include a data collection action. For example, action 28 may provide for collection of data, such as log data 72 and/or event data 76, which may be stored in database 74, collection of packet request-and-response data and the like. Log data 72, such as data associated with a predetermined log identifier, a call log, an Internet session log or the like, may be collected and stored in device memory, such as database 74 and/or within registries of processing engine 35 and/or processing subsystems 50. Event data 76 may comprise data associated with a predetermined event identifier, as defined by a communications protocol or as defined in an over-the-air message, and/or any data corresponding to a specific scenario predetermined by a communication subsystem. Event data 76 may be stored in device memory, such as database 74 and/or within registries of processing engine 35 and/or processing subsystems 50. For example, event data 76 may correspond to a call that is dropped (i.e., "call drop" event data) or the failure to establish a call connection (i.e., "call failure" event data). Request-and-response data are defined by specific instructions within the configuration message 33 that direct the task module 36 to issue a query to collect one or specific data packets on the wireless device. For example, the configuration message 33 may include a request-and-response action that directs the device to collect (i.e., "request") a specific data packet. The request-and-response action may be configured as a one-time-only request or the request-and-response action may be configured such that the request is made at predetermined intervals (e.g., once every 5 seconds) or at predetermined times. Additional examples of event data 76 include over-the-air (OTA) messages or any portion or OTA messages.

In other aspects, action 28 may include initiating or terminating of any other application or function that is associated with the wireless device. Examples include disabling the device or a device component, providing for limited device use, executing a device component or an application on the device if a specific condition is met. For example, a condition may define a battery level threshold and, if the battery level falls below the threshold, then the action that ensues is the disablement of certain predefined device components to conserve battery power.

In addition, the task action interpreter 40 is operable to determine, from received configuration messages 33, any action parameters 30 associated with the actions 28 and apply the action parameters 30 to the associated action. Examples of action parameters 30 will be described in detail infra., such as with respect to FIGS. 8-14.

In some aspects, in which the action 28 is defined by data collection, the collected data is stored as one or more collected data logs 78 and may be communicated to the network device 14 for further processing and analysis. In aspects in which the collected data is communicated to a network device, the task module 36 may further include data reporter 80 that determines, from the received configuration messages 33, data reporting parameters 82 that configure the communication of collected data to the network device 14 or any other network entity. For example, data reporting parameters 82 may include instructions on how the collected data is to be communicated to the network device and may define the timing for communicating the collected data. For example, the data may be configured to be communicated to the network device on an ongoing basis, on a predetermined interval basis, such as hourly, daily, weekly, etc. on the occurrence of a predefined triggering event or at the request of a predetermined party, such as the service provider, network device and/or wireless device user.

Additionally, computer platform 44 may further include one or more listener agents 51 dynamically instantiated based on a respective one or more parsed condition 22, and/or one or more condition parameters 24, and/or one or more parsed actions 28, and/or one or more action parameters 30, as respectively determined by task condition interpreter 38 and task action interpreter 40. For example, listener agent 51 may be instantiated in API 48, or in any area of memory 46, and may further communication between an instantiating program, such a task module 36, and processing engine 35 via one or both of static extension 47 and dynamic extension 49. Further, each listener agent 51 may correspond to a single one or a plurality of any combination of conditions 22, condition parameters 24, actions 28, and action parameters 30. For example, more than one action 28 or action parameter 30 may depend on the occurrence of a common condition 22, and thus a single listener agent 51 may be instantiated corresponding to the more than one action 28 or action parameter 30, for example, to save device resources such as memory. For example, listener agent 51 may correspond to a given event identifier, log code identifier, and/or any other parameter for monitoring and/or for performing an action as defined by condition 22 and/or condition parameter 24 and/or parsed action 28 and/or action parameters 30. Each listener agent 51 is operable to monitor processing engine 35 for the occurrence of the corresponding condition 22 and/or condition parameter 24 and/or parsed action 28 and/or action parameters 30 and record data associated with the condition and/or condition parameter, such as logging the occurrence of an event identifier, logging the payload of a log code. Further, for example, each listener 51 may alternatively or additionally notify an interested program, such as task module 36, of the occurrence of the condition and/or condition parameter, thereby triggering action 28 based on action parameter 30.

As previously noted, computer platform 44 may further include a communications module 84 embodied in hardware, firmware, software, and combinations thereof, that enables communications among the various components of the wireless device 10, as well as between the wireless device 10 and the wireless network 12. The communication module may include the requisite hardware, firmware, software and/or combinations thereof for establishing a wireless communication connection. The communication module 84 receives task configuration messages/communications 33 from network device 14 and, in some aspects, communicates the data related to the task 78 to network devices for further processing and analysis.

Additionally, wireless device 10 has input mechanism 86 for generating inputs into wireless device, and output mechanism 88 for generating information for consumption by the user of the wireless device. For example, input mechanism 86 may include a mechanism such as a key or keyboard, a mouse, a touch-screen display, a microphone in association with a voice recognition module, etc. Further, for example, output mechanism 88 may include a display, an audio speaker, a haptic feedback mechanism, etc.

Figure 3:
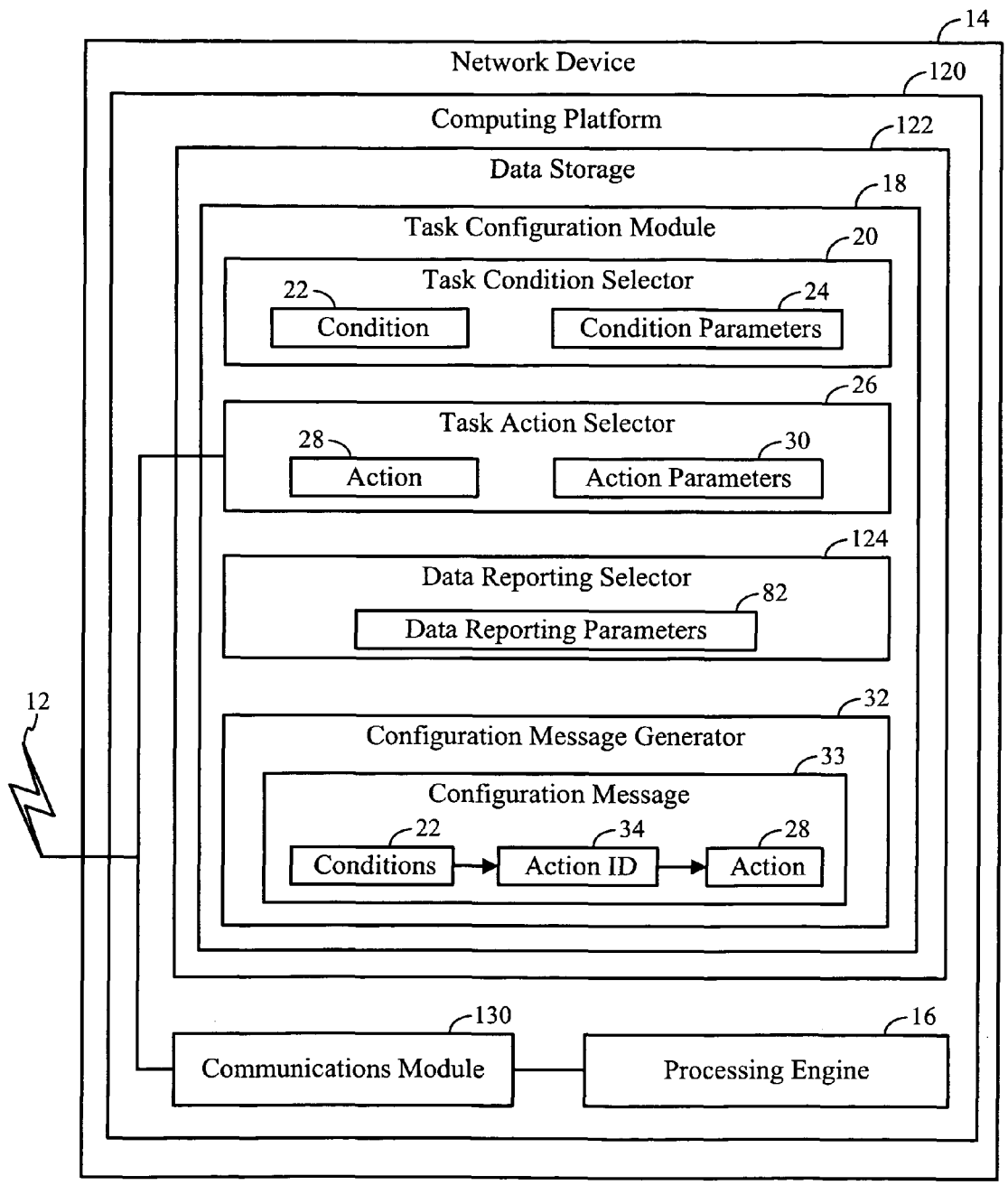
FIG. 3 is schematic diagram of one aspect of a cellular telephone network for implementing configurable data collection at the cellular telephone device level.

Referring to FIG. 3, according to another aspect, a block diagram is illustrated of a network device 14, such as a user manager server. The network device may comprise at least one of any type of hardware, server, personal computer, mini computer, mainframe computer, or any computing device either special purpose or general computing device. Further, the modules and applications described herein as being operated on or executed by the network device 14 may be executed entirely on the network device 14 or alternatively, in other aspects, separate servers or computer devices may work in concert to provide data in usable formats to parties, and/or to provide a separate layer of control in the data flow between the wireless device 10 and the modules and applications executed by network device 14.

The network device 14 has computer platform 120 that can transmit and receive data across wireless network 12, and that can execute routines and applications. Computer platform 120 includes a data storage 122, which may comprise volatile and nonvolatile memory such as read-only and/or random-access memory (RAM and ROM), EPROM, EEPROM, flash cards, or any memory common to computer platforms. Further, data storage 122 may include one or more flash memory cells, or may be any secondary or tertiary storage device, such as magnetic media, optical media, tape, or soft or hard disk. Further, computer platform 120 also includes a processing engine 16, which may be an application-specific integrated circuit ("ASIC"), or other chipset, processor, logic circuit, or other data processing device. The computer platform 120 may further include a communications module 130 embodied in hardware, firmware, software, and combinations thereof, that enables communications among the various components of the network device 14, as well as between the network device 14 and the wireless network 12. The communication module may include the requisite hardware, firmware, software and/or combinations thereof for establishing a wireless communication connection.

The data storage 122 of the network device 14 includes task configuration module 18. As mentioned previously, the task configuration module 18 includes task condition selector 20 that is operable to provide for selection of conditions 22 and associated condition parameters 24. For example, selection of the task conditions may be conducted by a service provider representative, a network device administrator or any other authorized entity that has access to the network device.

In addition, the task condition selector 20 is operable to provide selection of condition parameters 24 associated with the selected conditions. Examples of condition parameters 24 will be described in detail infra., such as with respect to FIGS. 8-14.

The task configuration module 18 additionally includes task action selector 26 that is operable to provide for selection of action 28 and associated action parameters 30. Selection/configuration of an action 28 typically corresponds with selection/configuration of an associated condition and, as such, may be conducted by a service provider representative, a network device administrator or any other authorized entity having access to the network device.

In addition, the task action selector 26 is operable to provide selection of action parameters 30 associated with the selected action 28. Action parameters further define and/or limit the action. Examples of action parameters 30 will be described in detail infra., such as with respect to FIGS. 8-14.

The task configuration module 18 may, optionally, include data reporting selector 124 that is operable to provide for selection of data reporting parameters 82. Data reporting parameters define characteristics related to communicating data related to the action 28, such as collected data, to the network device or to other networked devices for further processing and analysis. For example, data reporting parameters may include intervals for communicating the data, such as continuous communication, predetermined interval communication (e.g., hourly, daily, weekly, monthly, etc.), predetermined event triggered communication, service provider representative requested communication, network device administrator requested communication and/or wireless device user requested communication and the like.

The data collection configuration module 18 may further include configuration message generator 32 that is operable to generate configuration messages 33 based on the selected data collection conditions, actions and associated parameters. The configuration message may be configured such that selected conditions 22 are associated with one or more action identifiers 34 that correspond to a specific action 28. Further detailed explanation of the configuration message is described in relation to FIGS. 6 and 7, infra. Once the configuration message 33 generated, the communication module 130 provides for the message 33 to be communicated to one or more wireless devices 10.

Referring once again to FIG. 1, the wireless network 12 includes any communications network operable, at least in part, for enabling wireless communications between wireless device 10 and any device connected to wireless network 12, such as network device 14. Further, wireless network 12 may include all network components, and all connected devices that form the network. For example, wireless network 12 may include at least one, or any combination, of: a cellular telephone network; a multicast network such as a Forward Link Only (FLO) network, such as the MEDIAFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association (IrDA)-based network; a short-range wireless network; a BLUETOOTH technology network; a ZIGBEE protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance ("Wi-Fi Alliance") network, and a 802.11 network; a public switched telephone network; a public heterogeneous communications network, such as the Internet; a private communications network; and a land mobile radio network.

Suitable examples of telephone networks include at least one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1×) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 4:
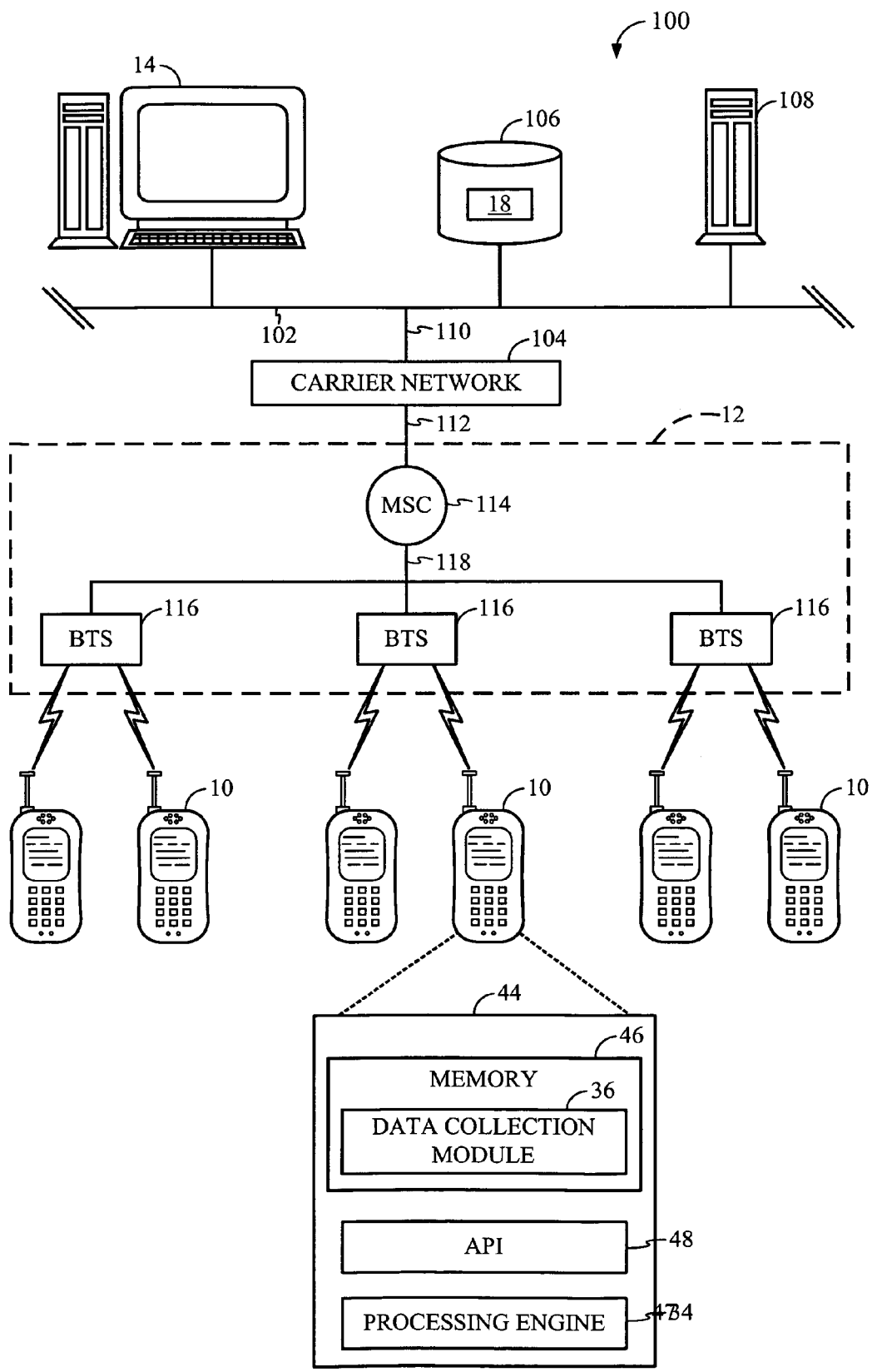
FIG. 4 is a block diagram of a network device that is operable to configure data collection and communicate the data collection configuration parameters to the wireless device, according to one aspect.

Referring to FIG. 4, in one specific aspect, wireless device 10 for data collection comprises a cellular telephone. A cellular telephone system 100 may include a plurality of wireless devices 10 in communication with wireless network 12, which is connected to a wired network 102 via a carrier network 104. Wireless devices 10 are being manufactured with increased computing capabilities and often can communicate packets including voice and data over wireless network 12. As described earlier, these "smart" wireless devices 10 have APIs 46 resident on their local computer platform 44 that allow software developers to create software applications that operate on the cellular telephone 10, and control certain functionality on the device. FIG. 3 is a representative diagram that more fully illustrates the components of a cellular wireless network and the interrelation of the elements of one aspect of the present system. Cellular wireless network 12 is merely exemplary and can include any system whereby remote modules, such as wireless devices 10 communicate over-the-air between and among each other and/or between and among components of a wireless network 12, including, without limitation, wireless network carriers and/or servers.

In system 100, network device 14 can be in communication over a wired network 102 (e.g. a local area network, LAN) with a separate data repository 106 for storing the task configuration module 18, or the like. Further, a data management server 108 may be in communication with network device 14 to provide post-processing capabilities, data flow control, etc. Network device 14, data repository 106 and data management server 108 may be present on the cellular telephone system 100 with any other network components that are needed to provide cellular telecommunication services. Network device 14, and/or data management server 108 communicate with carrier network 104 and wireless network 12 through data links 110 and 112, which may be data links such as the Internet, a secure LAN, WAN, or other network. Carrier network 104 controls messages (generally being data packets) sent to a mobile switching center ("MSC") 114. Further, carrier network 104 communicates with MSC 114 by a network 112, such as the Internet, and/or POTS ("plain old telephone service"). Typically, in network 112, a network or Internet portion transfers data, and the POTS portion transfers voice information. MSC 114 may be connected to multiple base stations ("BTS") 116 by another network 118, such as a data network and/or Internet portion for data transfer and a POTS portion for voice information. BTS 116 ultimately broadcasts messages wirelessly to the wireless devices, such as wireless devices 10, by short messaging service ("SMS"), or other over-the-air methods.

Figure 5:
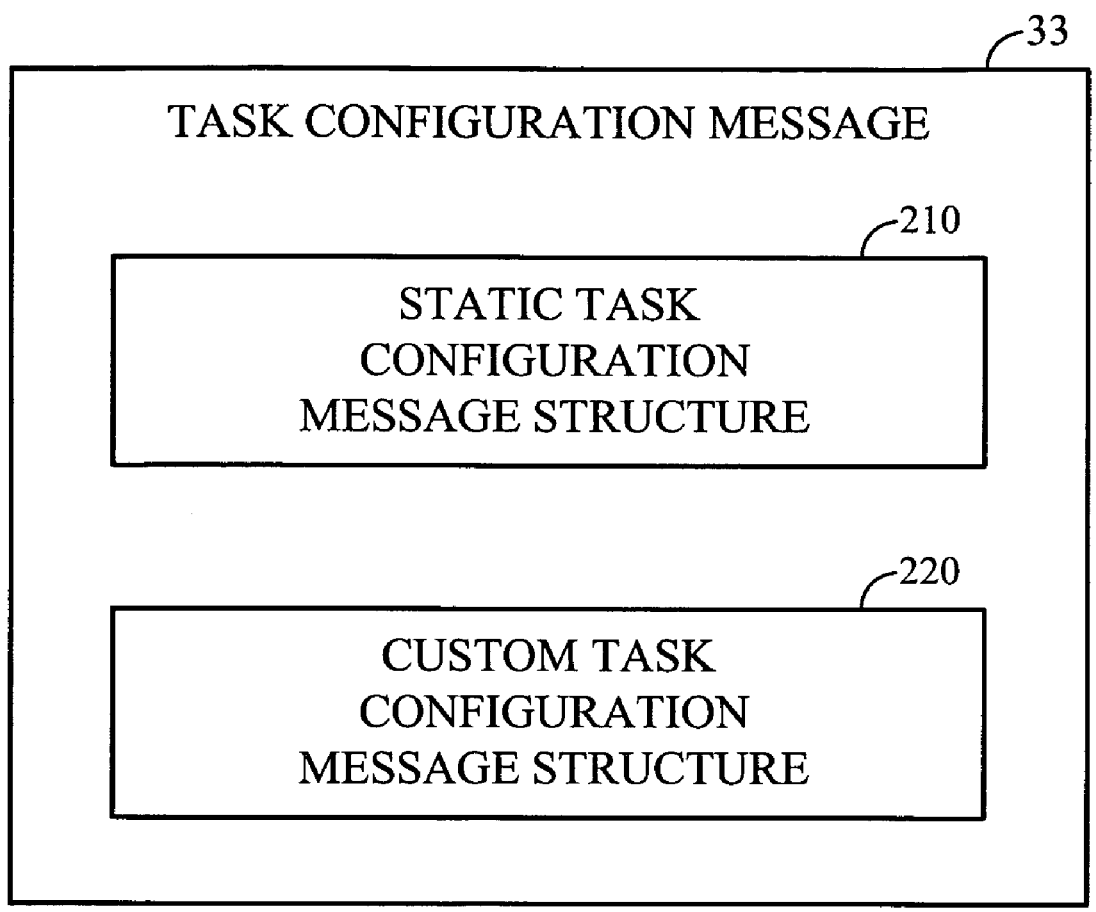
FIG. 5 is a block diagram of data collection configuration message, according to one aspect.

FIG. 5 provides for a block diagram description of the structure of a task configuration message 33, in accordance with an aspect. The configuration message 33 may include a static structure block 210 that may include standard message data, such as one or any combination of a Media Access Control (MAC) address, a network address of the network device, an IP address of the wireless devices, a time stamp of when the configuration message is communicated and any other header-type information. Additionally, the configuration message 33 may include a custom, dynamically-configurable structure block 220 that may include a task condition block that includes a list of conditions and action identifiers associated with the conditions, and that may include an action block that includes a list of actions correlated to the action identifiers.

Figure 6:
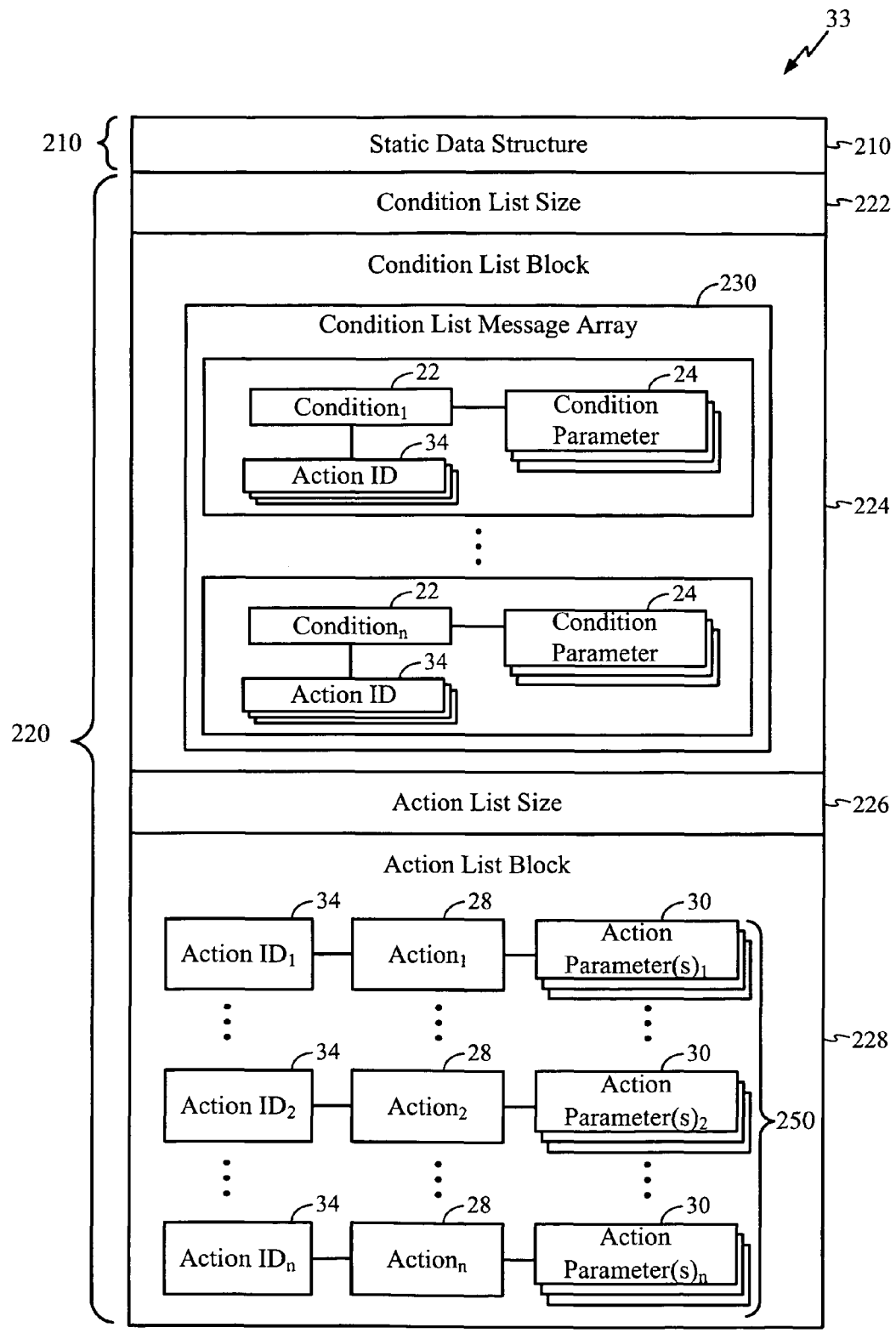
FIG. 6 is a block diagram of a data collection-configuration message detailing the condition blocks and the action blocks, according to another aspect.

FIG. 6 provides a more detailed block diagram description of the custom configuration message 33, in accordance with an aspect. Specifically, FIG. 6 details the custom configurable structure 220, which may include a dynamically configurable condition portion and a dynamically configurable action portion. In one aspect, the condition portion may include a condition list size block 222 and a condition list block 224. Condition list size block 222 identifies the size, which may vary, of the condition portion of the message. Condition list block 224 identifies a listing of dynamically configurable conditions used to trigger the given task, i.e. the action or actions to occur on the wireless device, such as conditions for collecting data. In one aspect, condition list block 224 may include a condition list message array 230 which defines one or more dynamically configurable data collection conditions 22, each which may be subject to one or more associated, dynamically configurable condition parameters 24. Further, condition list message array 230 may associate each condition 22 with one or more action identifiers (IDs) 34, which respectively map to one or more actions to implement upon detection or occurrence of the condition. Each action ID 34 is a value that corresponds to an action specified in the custom configuration message 33, for example, to one or more actions 28 listed in the dynamically configurable action portion of the message. In some aspects, for example, the action portion of custom configuration message 33 may include an action list size block 226 and an action list block 228. Action list size block 226 identifies the size, which may vary, of the dynamically configurable action portion of custom configuration message 33. Action list block 228 identifies a listing of dynamically configurable actions 28. Each action 28 may comprise a value that identifies the type of action to occur upon detection/occurrence of the condition, such as a data collection action. In one aspect, action list block 228 may include an action list message array 250 that correlates or maps each action ID 34 to a respective action 28, where each action 28 may be carried out in accordance with one or more associated, dynamically configurable action parameters 30. In other words, custom configuration message portion 220 provides an easily changeable data structure that enables one or more actions to be carried out on a wireless device based upon the detection or occurrence of one or more conditions. Each condition and action may be subject to one or more condition/action parameters that may further define, modify or limit the respective condition/action. Additionally, custom configuration message portion 220 provides a highly efficient and compact structure by providing a relational database of actions and conditions, which may be cross-referenced through a corresponding action identifier. As such, multiple task-triggering conditions be defined to perform the same action through the action identifier, thereby allowing the data associated with the given action to be listed only once within the message.

Figure 7:
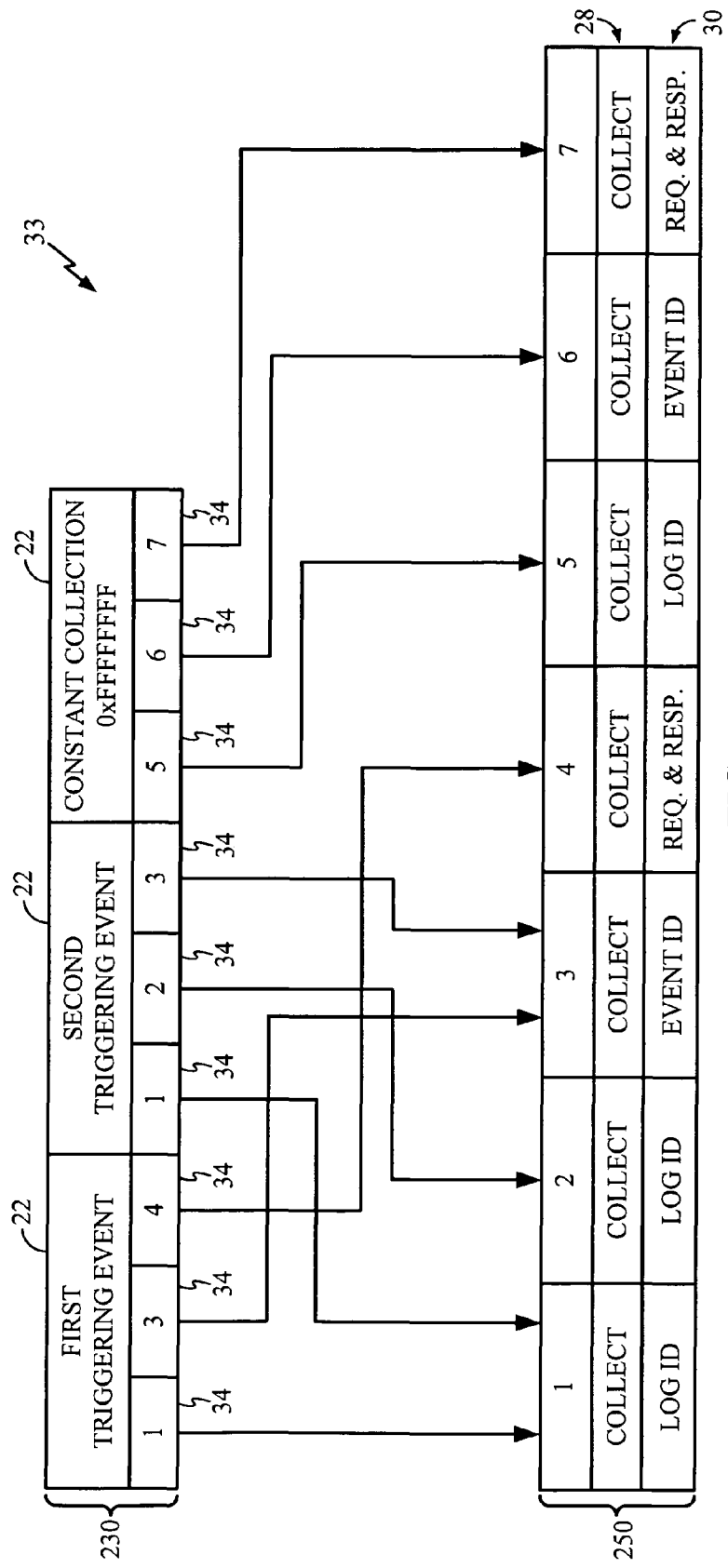
FIG. 7 is block diagram of a data collection-configuration message detailing an array of conditions and an array of actions, according to another aspect.

FIG. 7 illustrates the mapping of task conditions to one or more actions, specifically the mapping of data collection conditions to one or more data collection actions, in accordance with an aspect. Each task configuration message 33 may comprise a condition list message array 230 and an action list message array 250. As shown, condition list message array 230 maps each condition 22 to one or more action identifiers (IDs) 34. The action IDs 34 are mapped to an action 28 within the action list message array 250. As shown, the first triggering event condition 22 maps to action IDs "1", "3" and "4" 34, which correspond to the actions 28 of collecting data based on the action parameters 30, such as respectively collecting log data based on a given log identifier, collecting event data based on a given event identifier, and collecting the results of a request-and-response message. The second triggering event condition maps to action identifiers "1", "2" and "3" 34, which correspond to the actions 28 of collecting data based on the action parameters 30, such as respectively collecting log data based on a given log identifier, collecting log data based on a given log identifier, and collecting event data based on a given event identifier. The constant collection condition 22 maps to action identifiers "5", "6" and "7" 34, which respectively correspond to collecting log data based on a given log identifier, collecting event data based on a given event identifier, and collecting the result of a given request-and-response message. It should be noted that while FIG. 7 shows an example in which each condition is mapped to three actions, other aspects provide for the conditions within a configuration message to be independently mapped to any number of actions. For example, a triggering event condition may be mapped to one event action and a constant collection condition may be mapped to two event actions, two log actions and two request-and-response actions; six actions total.

As previously noted, the conditions and actions will typically be configured such that any condition or action has associated parameters that further define the condition or action.

Examples of condition parameters 24 related to aspects in which the action taken is defined by data collection include, but are not limited to, a condition identification (ID), the condition priority, condition overflow option, condition buffer size, condition buffer limit, condition threshold, collection interval defined by a pre-condition time and a post-condition time, payload match criteria including the payload size and/or block, the number of actions associated with the condition and a listing of the associated actions.

The condition identification parameter will typically be a value that correlates to a specific triggering event, such as an event identifier, or in the case of constant collection, the condition identification may be a special value, such as the maximum allowed value or any other value which will allow for the constant collection of all associated parameters and/or actions, such as logs, events, request-and-response packets and/or the like.

The condition priority parameter is the priority assigned to the condition, such that the evaluation of the condition and/or the performance of the associated actions may be ranked in the case where limited resources exist on the wireless device and multiple conditions are present. For example, the priority parameter may prioritize the delivery of collected data to the application. In some aspects, for example, a relatively high priority value will insure the condition is evaluated and/or the associated action takes place, while a relatively low priority value will dictate that the condition is evaluated and/or the associated action will be performed only if the resources are available.

The condition overflow option parameter sets the overflow listener parameter to define the action that takes place when a temporary storage buffer is full of collected data. Option parameters include, but are not limited to, "drop" data when buffer is filled, "clobber" to discard collected data when buffer is filled, "notify" user when buffer is full or approaching maximum storage and the like. Condition overflow may be set to a value that indicates a combination of options.

The condition buffer size parameter sets the amount of storage space allocated to collection of data for the specified condition and condition buffer limit parameter sets the amount of useable space in the allocated storage space. The condition threshold parameter sets the threshold for buffer usage that triggers notification of the collecting application that storage space is approaching maximum allocated space. A special value for threshold may dictate that no notification is sent to the collecting application as the storage space approaches maximum allocation or another special value may dictate that the application is notified each time a triggering event occurs.

As previously noted, the condition interval parameter may include the pre-condition time and the post-condition time. The pre-condition time is the time prior to the occurrence of the triggering event for which action is to be taken, such as data collection. For example, if the pre-condition time is set to two seconds, data collection will occur for actions that occur up to two seconds prior to the occurrence of the triggering event. The post-condition time is the time after the occurrence of the triggering event for which the respective action, such as data collection, is to be taken. For example, if the post-condition time is set to four seconds, data collection will occur for actions that occur up to four seconds after the occurrence of the triggering event.

The payload match or mismatch criteria parameter may include, but is not limited to, the matching or mismatching value to be found in the payload block, the matching or mismatching size of the payload block, the offset location of the payload in the data block and the like.

The action parameters may include parameters that further define the actions to be taken. Examples of action parameters 30 include, but are not limited to, action sampling rate, logging value, logging priority, logging logic, logging overflow option, logging buffer size, logging buffer limit, logging threshold, payload offset, and payload size. In addition, some of these action parameters may be specific to an action type or to another associated action parameter. For example, the collection of a log code and/or an event ID may be associated with parameters that include, but are not limited to, one or any combination of log or event identification, primary and alternative logging or event priority, action overflow option, action buffer size and limit, action threshold, payload match criteria, including payload size, payload value and payload offset and additional action logic. Additionally, request-and-reply actions may be associated with parameters that include, but are not limited to, one or any combination of the size of a requested packet, the block containing the requested packet and additional action logic.

The action sampling rate parameter may be configured to define the rate at which the action will be sampled. Typically, the sampling rate is defined in packets per second. Additionally, by way of example, if the sampling rate is four packets per second, the sampling rate may further be configured to collect the first four packets within the second, the last four packets within the second, random collection of packets within the second or any other conceivable collection scheme can be defined. In some aspect, the sampling rate may be set to a special value (e.g., the maximum allowed value) to indicate that no sampling rate has been set (i.e., all data packets are to be collected).

Additional action logic, which is relevant to collecting log data, event data and request-and-response data, allows for additional rules to be defined for collection of data. The action logic field of the configuration message may include one or more values that correspond to the additional rules. Examples, of additional action logic rules include, but are not limited to, payload mismatch (i.e., collecting only if the payload of the packet differs from the payload of the previous packet), do not collect if the payload matches, request-and-response only at device power-up, request-and-response at the beginning of each log file write and the like.

The log or event value comprises an identification (ID) or code that corresponds to the log code or event being collected.

The primary logging or event priority is a value that is set to define the collection priority for the action. Typically, a value is assigned to define the priority in the likelihood that multiple actions occur simultaneously.

The action overflow option sets an overflow listener parameter to define the action that takes place when the temporary storage buffer is full of collected data. Option parameters include, but are not limited to, "drop" data when buffer is filled, "clobber" discard collected data when buffer is filled, "notify" user when buffer is full or approaching maximum storage and the like. Action overflow may be set to a value that indicates a combination of options.

The action buffer size sets the amount of storage space, within the action buffer, allocated for the collection of data for the specified action and the action buffer limit sets the amount of useable space within the allocated storage space. The action threshold sets the threshold for buffer usage that will trigger notification of the collecting application that storage space is approaching maximum allocated space. A special value for action threshold may dictate that no notification is sent to the collecting application as the storage space approaches maximum allocation or another special value may dictate that the application is notified each time the action is collected.

Additionally, action parameters may include payload match criteria, for example, if the collection action further requires a payload match. Payload match parameters may include, but are not limited to, the matching value to be found in the payload block, the matching size of the payload block, an offset payload location within the block and the like.

Figure 8:
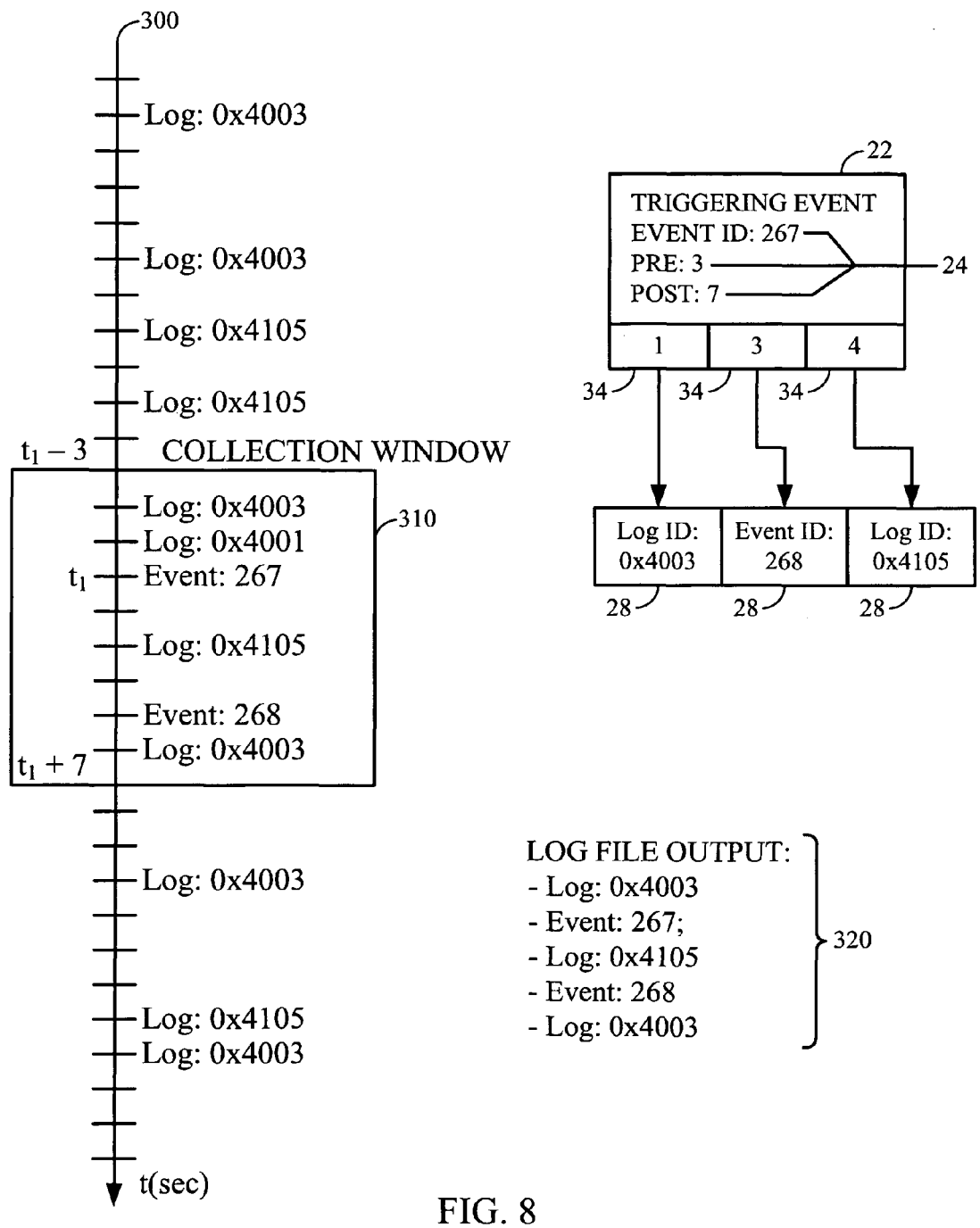
FIG. 8 is a block diagram and timeline example of configured data collection detailing a triggering event condition and associated log and event data collection actions, according to one aspect.

According to aspects, FIGS. 8-14 provide timeline, block diagram and log file descriptions of data collection actions performed in accordance with configured conditions and actions. FIG. 8 provides an example of a condition 22, such as a triggering event, including condition parameters 24 that define the triggering event condition identification (ID) as value "267", the pre-occurrence time as three (3) seconds and the post-occurrence time as seven (7) seconds. The pre-occurrence time and the post-occurrence time define a time interval comprising a collection window 310. The triggering event condition 22 is mapped to three action identifiers 34 having corresponding identifier values of "1", "3" and "4". The three action identifiers 34 respectively map to data collection action 28 for recording the payload of log ID "0x4003", data collection action 28 for recording the occurrence of event ID "268" and data collection action 28 for recording the payload of log ID "0x4105." The occurrence of condition 22, a triggering condition based on the occurrence of event ID 267, causes the definition of a collection window based on condition parameters 24 and further causes the action defined by actions 28. Referring to the timeline 300, the first occurrence of the triggering event 22 having event ID "267" sets the collection window 310 that is defined as three seconds prior to the triggering event (i.e., the pre-time) and seven seconds after the triggering event (i.e., the post-time). In particular, the actions define logging the value found in log ID "0x4003", event ID "268" and logging the value in log ID "0x4105". Thus, the configured action of data collection occurs for all detected conditions, e.g. for all occurrences of the configured event ID and log codes, during the collection window. As such, and log file 320 is compiled which includes all data corresponding to the defined actions 28, as well as the triggering event "267" 22. It should be noted that data collection could be configured such that conditions 22 and/or the condition parameters 24 may or may not be included in the log file.

Figure 9:
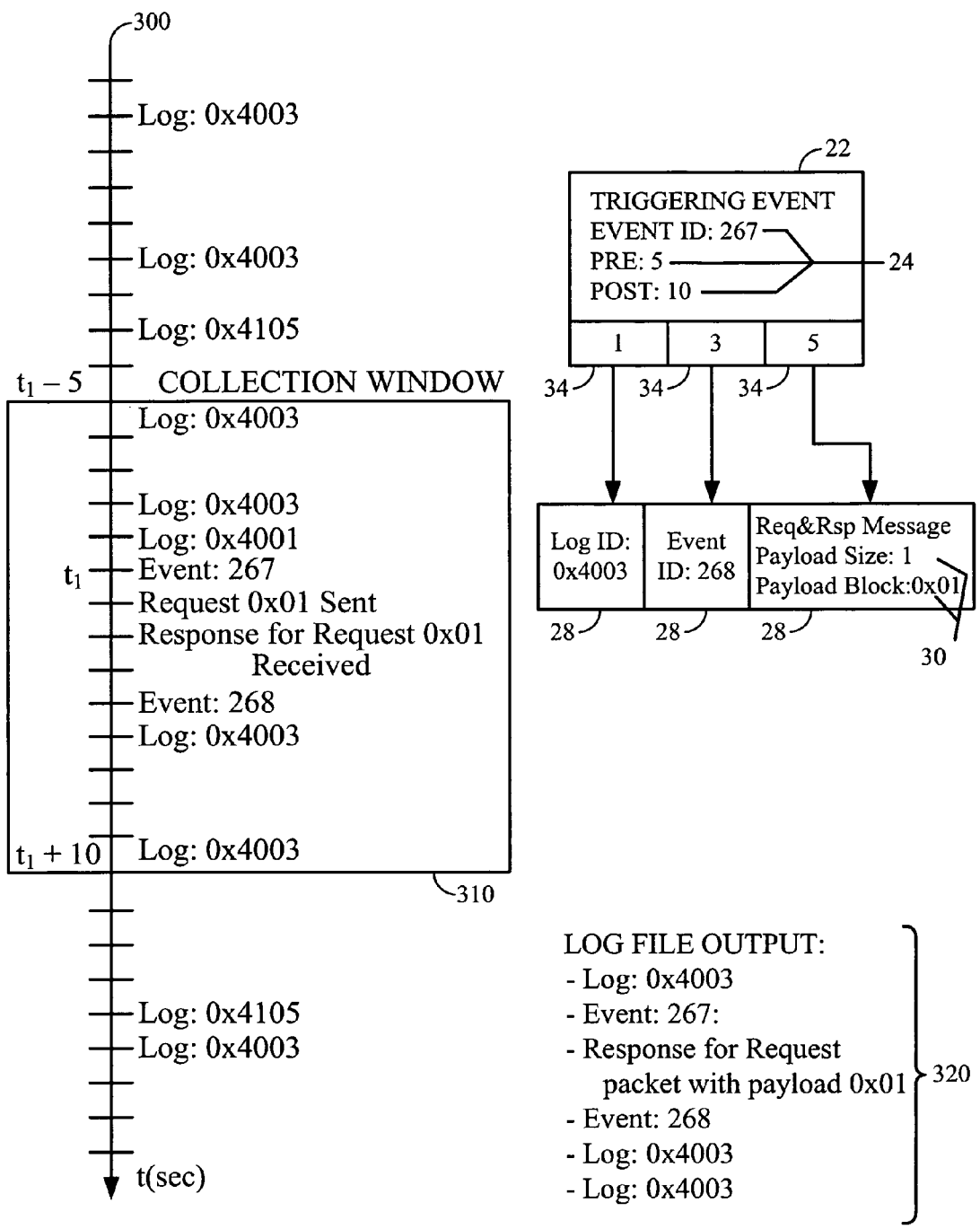
FIG. 9 is a block diagram and timeline example of configured data collection detailing a triggering event condition and associated log, event and request-and-response data collection actions, according to one aspect.

FIG. 9 provides the example of a condition 22, such as triggering event condition including parameters 22 that define the triggering event condition identification (ID) as event ID "267", the pre-time interval as five (5) seconds and the post-time interval at ten (10) seconds. The triggering event condition 22 is mapped to three action identifiers, 34 having corresponding identifier values of "1", "3" and "5". The action identifiers 34 map to log collection action 28 having log ID "0x4003", event collection action 28 having event ID "268" and request-and-response action 28 having action parameters 30 that correspond to requesting data having a payload size of one (1) and a value of "0x01". Referring to the timeline 300, the first occurrence of the triggering event "267" 22 sets the collection window 310 that is defined as five seconds prior to the triggering event (i.e., the pre-time) and ten seconds after the triggering event (i.e., the post-time). The occurrence of condition 22, a triggering condition based on event ID "267" causes the definition of a collection window based on condition parameters 24 and further causes the actions defined by actions 28. In particular, the actions define logging the value found in log ID "0x4003", event ID "268" and logging the response to a one-time-only request for a data packet having a payload size of "1" and a value of "0x01". Thus, collection occurs of all defined actions 28 that occur during the collection window and a one-time-only request-and-response action 28 is made for a packet having a payload size of "1" and payload value of "0x01". Log file 320 is compiled which includes all data corresponding to the defined actions 28, as well as the triggering event "267" condition 22.

Figure 10:
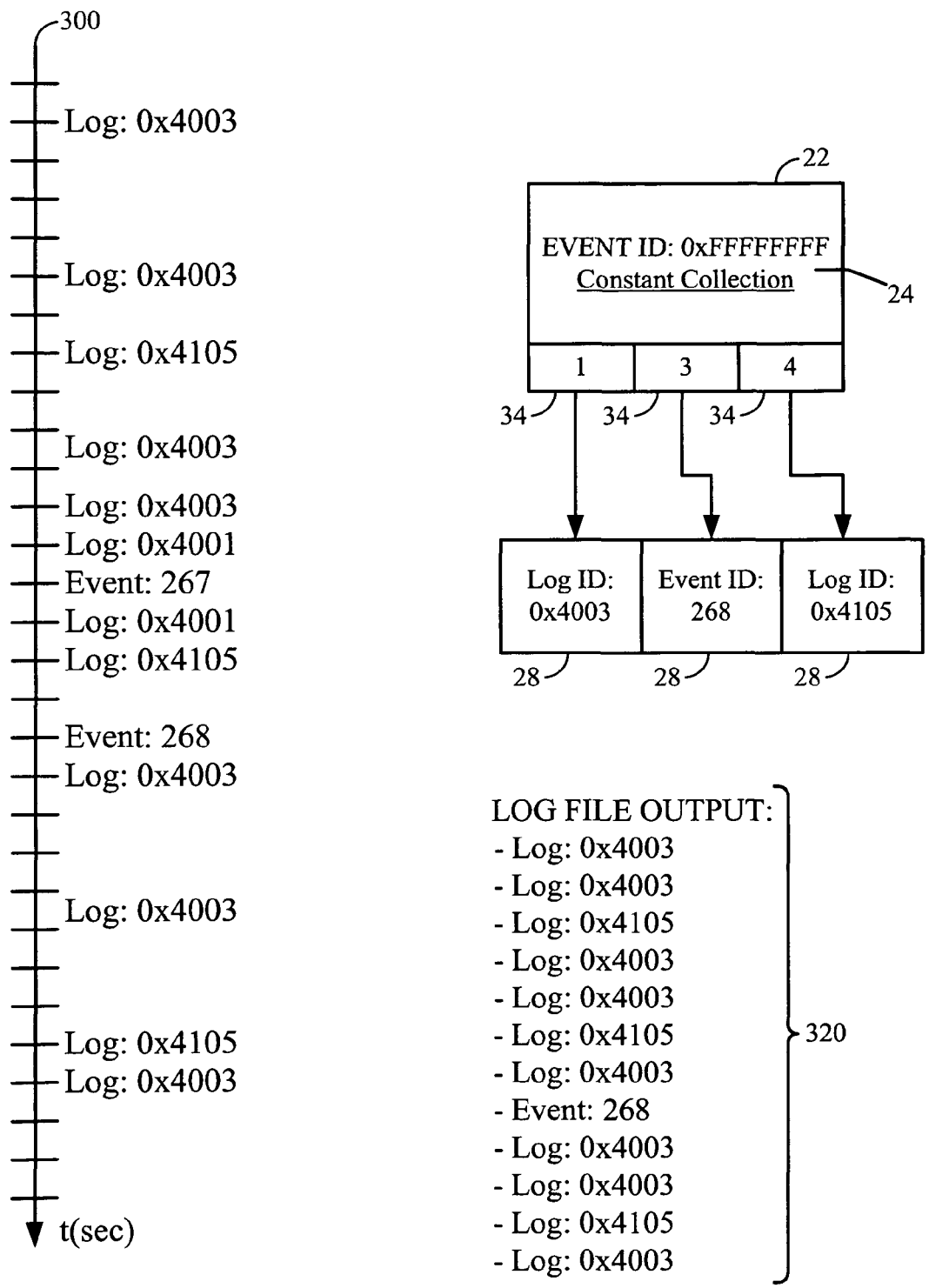
FIG. 10 is a block diagram and timeline example of configured data collection detailing a constant collection event condition and associated log and event data collection actions, according to one aspect.

FIG. 10 provides the example of a condition 22, such as constant collection condition including condition parameter 24 that correspondingly defines constant collection in terms of a maximum value event identification (ID), value "0xFFFFFFFF". The constant collection condition 22 is mapped to three action identifiers 34 having corresponding identifier values of "1", "3" and "4". The action identifiers 34 correspond to log collection action 28 having log ID "0x4003", event collection action 28 having event ID "268" and log collection action 28 having log ID "0x4105". Referring to the timeline 300, constant collection determines that all occurrences of the defined actions 28 are collected. In particular, the action results in constant logging of the value found in log ID "0x4003", constant logging of event ID "268" and constant logging of responses received from requests, conducted at 3 second intervals, for a data packet having a payload size of "1" and a value of "0x01". Thus, log file 320 is compiled which includes all data corresponding to the defined actions 28. It should be noted that a constant collection condition may be configured to occur continuously or may be configured to occur for a finite period of time.

Figure 11:
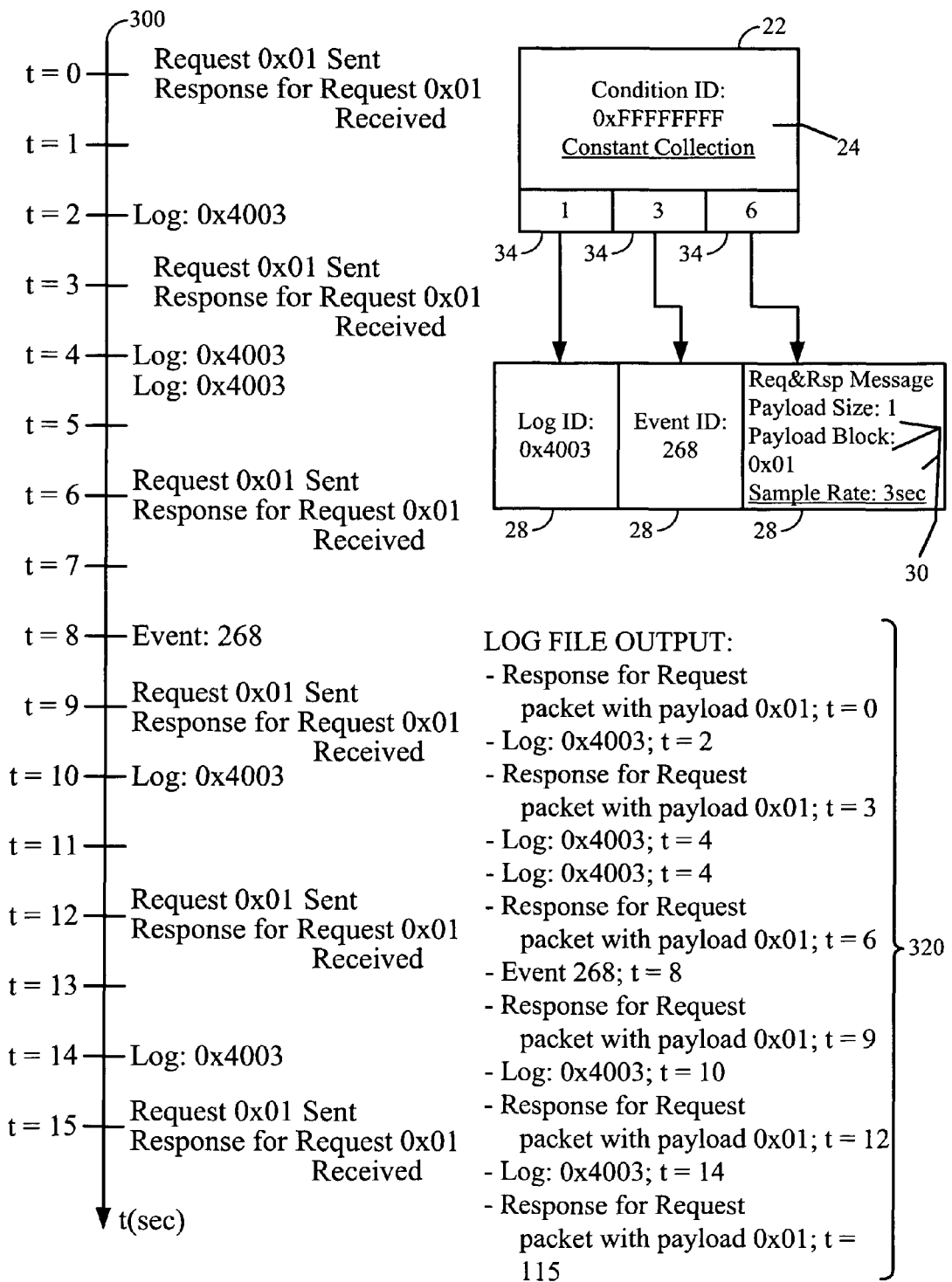
FIG. 11 is block diagram and timeline example of configured data collection detailing a constant collection event condition and associated log, event and response-and-request data collection actions, according to one aspect.

FIG. 11 provides the example of a condition 22; such as constant collection condition, including condition parameter 24 that correspondingly defines constant collection in terms of a maximum value event identification (ID), value "0xFFFFFFFF". The constant collection condition 22 is mapped to three action identifiers, 34 having corresponding identifier values of "1", "3" and "6". The action identifiers 34 correspond to log collection action 28 having log ID "0x4003", event collection action 28 having event ID "268" and request-and-response action 28 having action parameters 30 that correspond to requesting data having a payload size of one (1), a value of "0x01" and a sample rate of 3 seconds. The defined sample rate will provide for response-and-request inquiries to be made once every 3 seconds. Referring to the timeline 300, constant collection determines that all occurrences of the defined actions 28 are collected. In particular constant logging on the value found in log ID "0x4003", constant logging of event ID "268" and constant logging of the request-and-response inquiry, performed at the 3 second sample rate, for a data packet having a payload size of "1" and a payload value of "0x01". Thus, log file 320 is compiled which includes all data corresponding to the defined actions 28.

Figure 12:
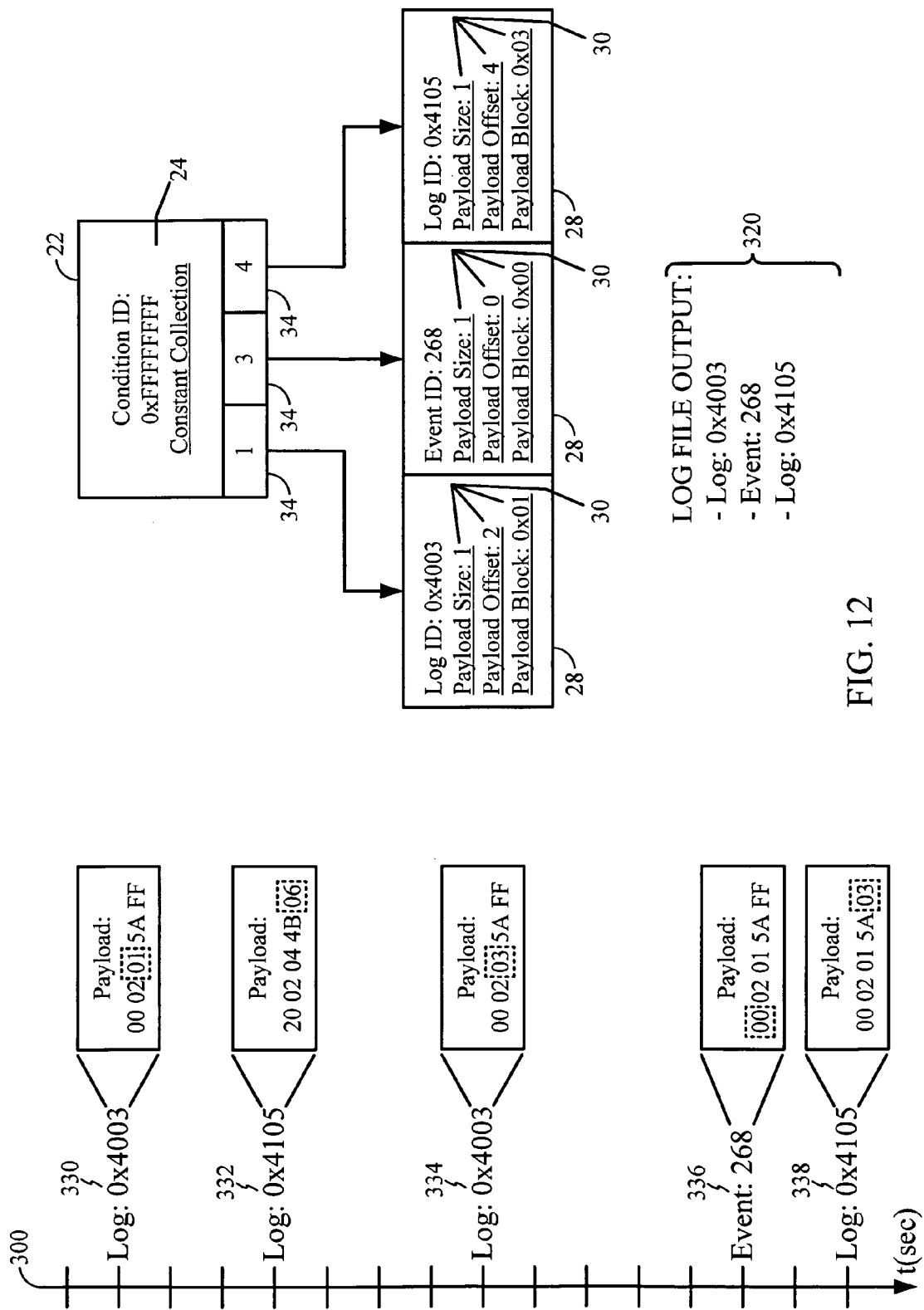
FIG. 12 is block diagram and timeline example of configured data collection detailing a constant collection event condition and associated log and event data collection actions that utilize payload matching, according to one aspect.

FIG. 12 provides the example of a condition 22; such as constant collection condition, including condition parameter 24 that correspondingly defines constant collection in terms of a maximum value event identification (ID), value "0xFFFFFFFF". The constant collection condition 22 is mapped to three action identifiers, 34 having corresponding identifier values of "1", "3" and "4". The action identifiers 34 correspond to log collection action 28 having ID value "0x4003", event collection action 28 having ID value "268" and log collection action 28. Each of the actions has payload match parameters. For example, log collection action 28 includes a payload size match action parameter 30 having a value of one (1), a payload offset match action parameter 30 having a value of two (2) and a payload block match action parameter 30 having a value of "0x01". Log collection action 28 includes a payload size match action parameter 30 having a value of one (1), a payload offset match action parameter 30 having a value of zero (0) and a payload block match action parameter 30 having a value of "0x00". Log collection action 28 includes a payload size match action parameter 30 having a value of one (1), a payload offset match action parameter 30 having a value of four (4) and a payload block match action parameter 30 having a value of "0x03". Referring to the timeline 300, constant collection determines that all occurrences of the defined actions 28 having the requisite payload match, as defined by action parameters 30, are collected. For example, the first occurrence 330 of an action 28, log collection action ID 0x4003 includes the requisite payload match criteria; a payload size of one, an offset of two and a block value of "01" and, therefore the corresponding log "0x4003" is collected. However, the second occurrence 332 of an action 28, log collection action "0x4105" does not include the requisite payload match criteria; a payload size of one, an offset of four and a payload block value of "03" because the payload block value is "06" and, therefore the corresponding log "0x4105" is not collected. Similarly, the fourth and fifth occurrences 336 and 338 of action 28 provide for payload match and are collected, while the third occurrence 334 does not provide for a payload match and is not collected. Thus, log file 320 is compiled which includes all data corresponding to the defined actions 28 and having the requisite payload match criteria.

Figure 13:
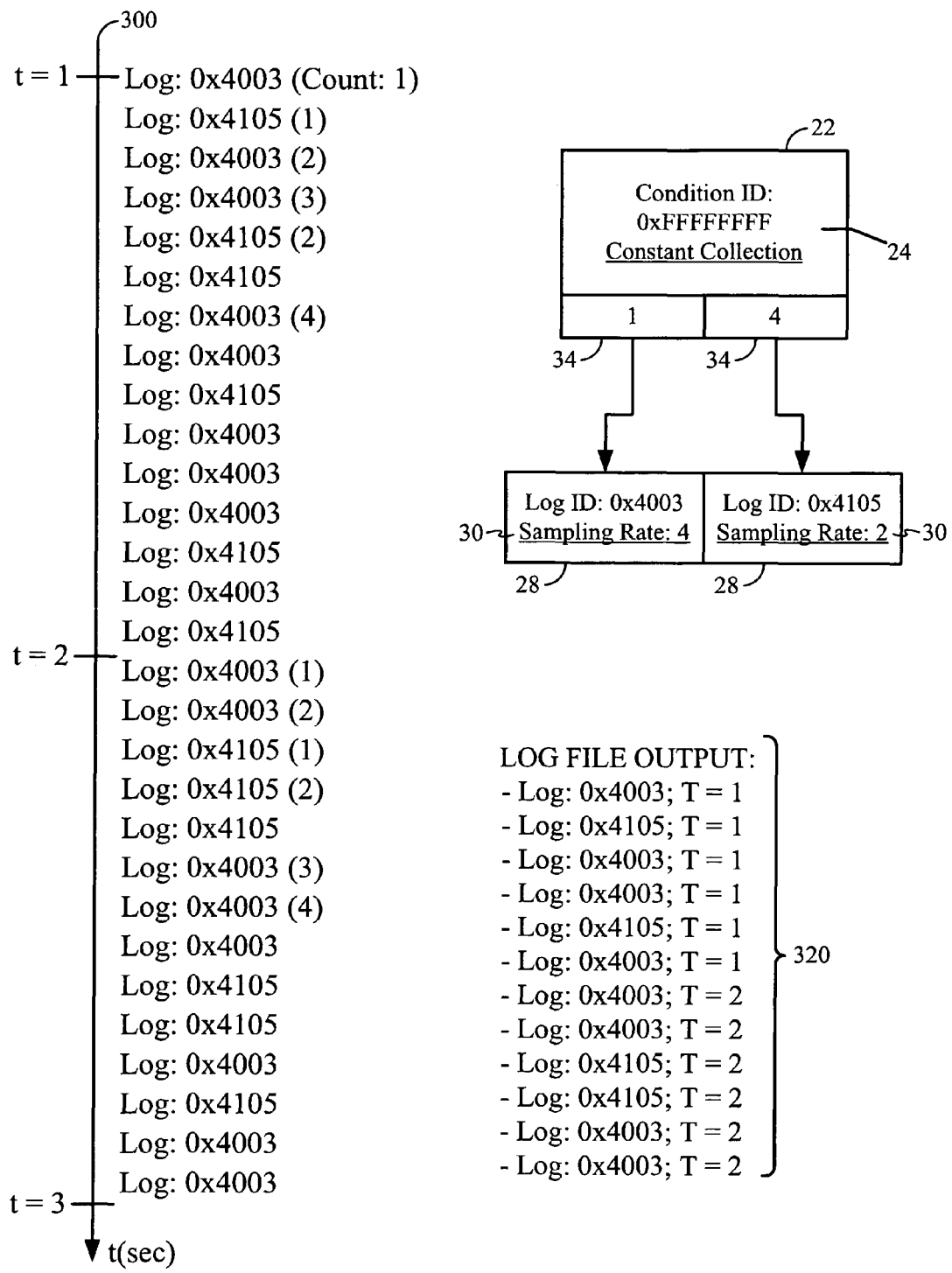
FIG. 13 is block diagram and timeline example of configured data collection detailing a constant collection event condition and associated log data collection actions that utilize logs to be collected at specific sampling rates, according to one aspect.

FIG. 13 provides the example of a condition 22; such as constant collection condition, including condition parameter 24 that correspondingly defines constant collection in terms of a maximum value event identification (ID), value "0xFFFFFFFF". The constant collection condition 22 is mapped to two action identifiers, 34 having corresponding identifier values of "1" and "4". The action identifiers 34 correspond to log collection action 28 having log ID "0x4003" and log collection action 28 having log ID "0x4105". Additionally each action has an associated sampling rate action parameter 30; log collection action ID "0x4003" 28 includes a sampling rate action parameter 30 value of four (4) samples per second and log collection action ID "0x4105" 28 includes a sampling rate action parameter 30 value of two (2) samples per second. Referring to the timeline 300, constant collection and sampling determines that the first four occurrences of log collection action ID "0x4003" 28 within a one-second interval are collected and the first two occurrences of log collection action ID "0x4105" 28 within a one-second interval are collected. All other occurrences of the log collection actions that occur during the prescribed time interval are not collected. It should be noted that while the example provides for collection of the first occurrences of the actions within the prescribed time interval, data collection may be configured to provide for collection of random occurrences within the prescribed time interval or collection may occur according to any other predefined collection scheme. Thus, log file 320 is compiled which includes all data logs corresponding to the defined actions 28 and collected according to the prescribed sampling rate parameters.

Figure 14:
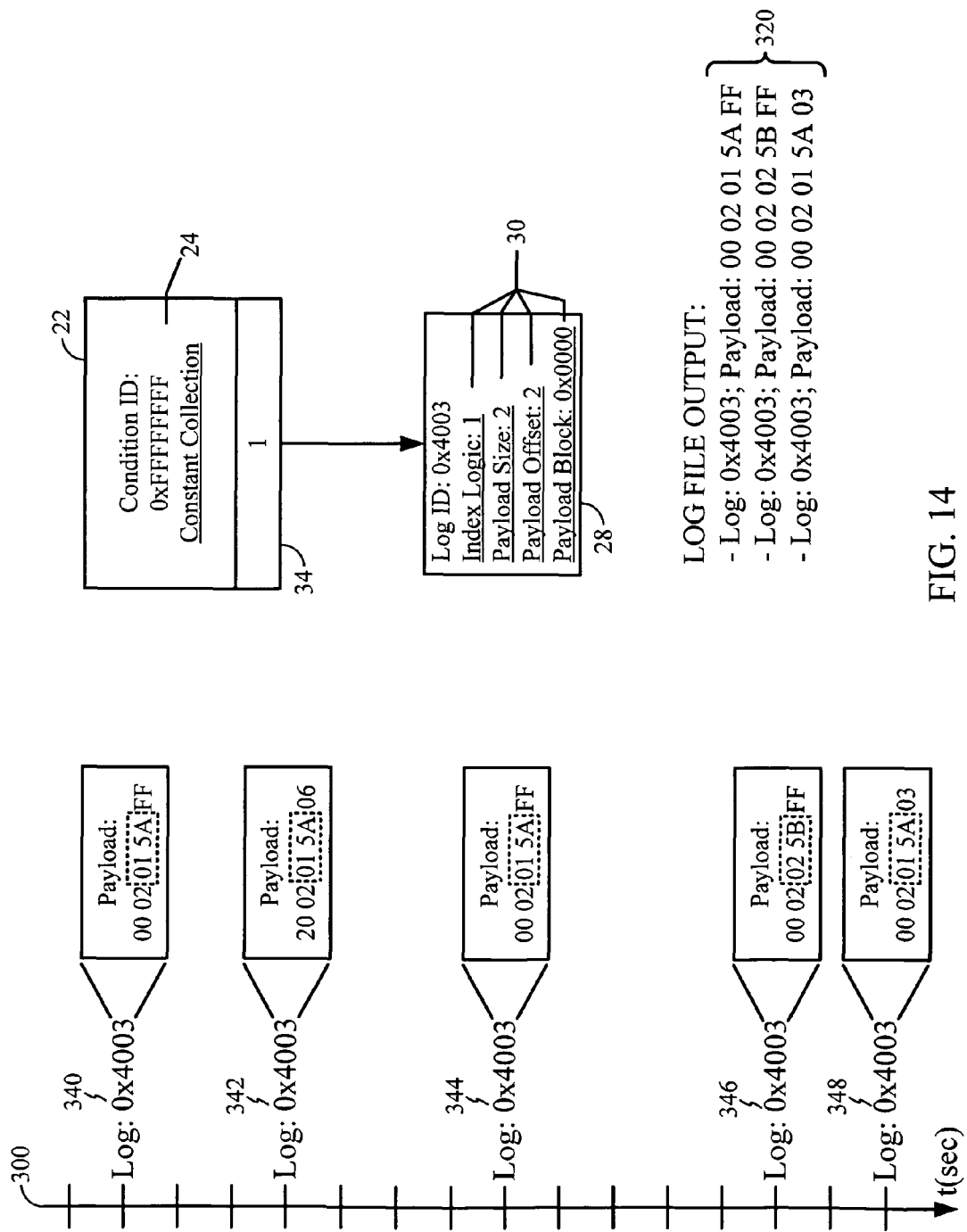
FIG. 14 is a block diagram and timeline example of configured data collection detailing a constant collection event condition and associated log action that implements logging logic, according to one aspect.

FIG. 14 provides the example of a condition 22, such as a constant data collection condition, including condition parameter 24 that correspondingly defines constant collection in terms of a maximum value event identification (ID), e.g. value "0xFFFFFFFF". In other words, the value "0xFFFFFFFF" may comprise a predetermined value representative of constantly performing the associated one or more actions 28, optionally based on a respective one or more action parameters 30. In this example, the constant condition 22 is mapped to one action identifier 34 having a corresponding identifier value of "1". The action identifier 34 corresponds to log collection action 28 having log ID "0x4003". The log collection action 28 includes an action logic parameter 30 having a logic value of "1". In this example, logic value of "1" is mapped to a collection rule that provides for collection only if the payload of the message differs from the payload of the previous message. The log collection action 28 further includes payload match action parameters 30 such as payload size match parameter having a value of two (2), a payload offset match parameter having a value of two (2) and a payload block match parameter having a value of "0x0000". Thus, the collection action 28 will only collect the log having log ID "0x4003" if the payload block of size of (2) two and offset (2) two differs from the payload of the previous message. Referring to the timeline 300, constant collection determines that all occurrences of the defined action 28 having the requisite payload differences are collected. As shown, the first, fourth and fifth occurrences 340, 346 and 348 provide for the requisite payload mismatch when compared to the preceding payload and, as such, are collected, while the second and third occurrences 342 and 344 do not provide for the requisite payload mismatch when compared to the preceding payload and, as such, are not collected. It is noted that the first occurrence 340 does not provide for a preceding occurrence and, as such, in the illustrated aspect, is treated as not matching a "previous" payload. Thus, log file 320 is compiled which includes all data corresponding to the defined action 28 and having the requisite payload difference criteria.

Figure 15:
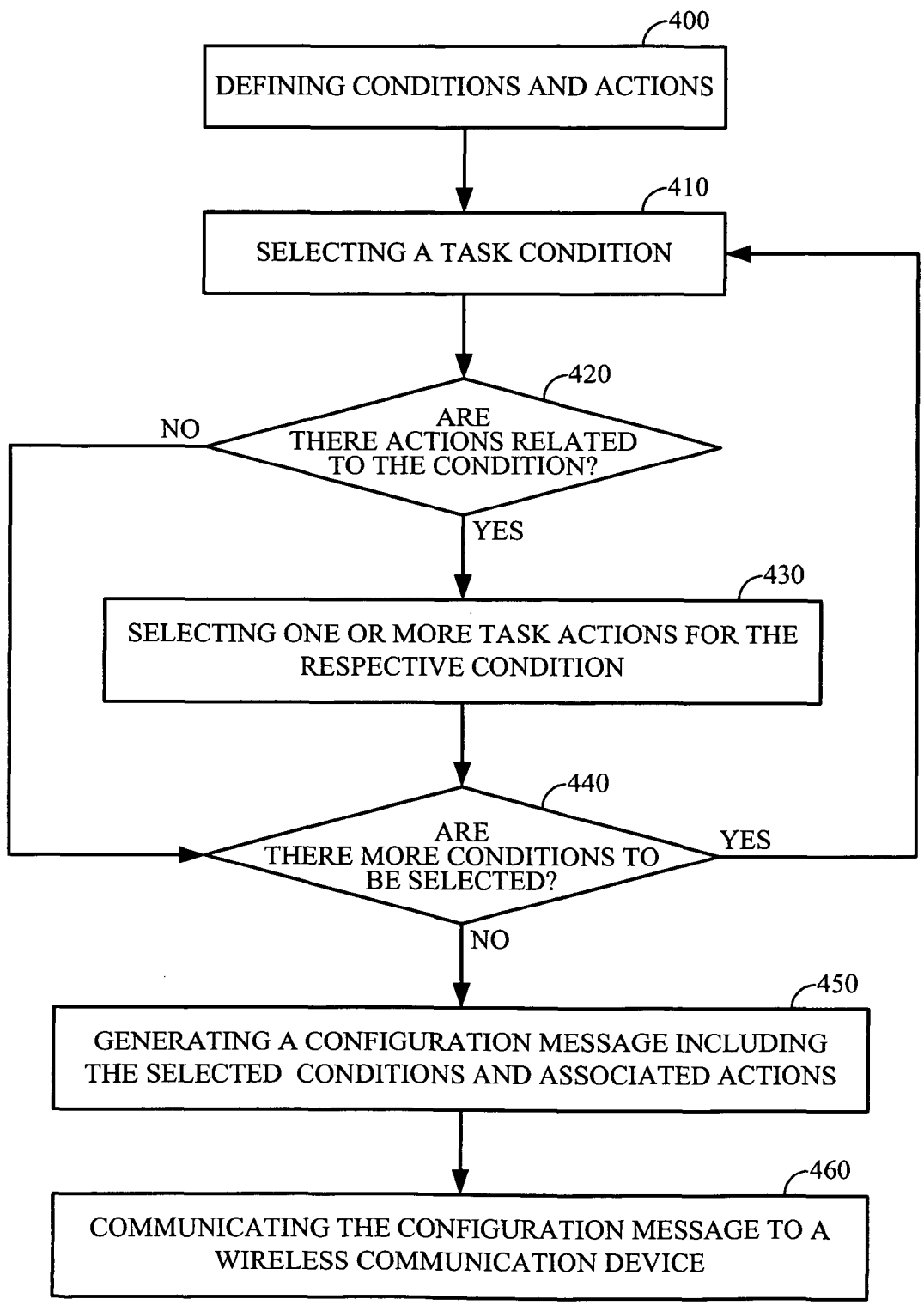
FIG. 15 is a flow diagram of a method for configuring wireless device data collection at a network device, according to another aspect.

Referring to FIG. 15, according to one aspect, a flow diagram of a method for configuring an action, such as data collection on a wireless device is presented. At Event 400, conditions and actions are defined within a task selection module and/or logic that is executable at network device. At Event 410, the task configuration module and/or logic is executed at a network device that allows a network administrator or service provider to select a task condition, such as a data collection condition. A data collection condition will determine when, and in some aspects if, data is to be collected. Examples of data collection conditions, which may be configured in programmable logic, include, but are not limited to, constant collection condition, triggering event collection and the like. In addition to providing for selection of a condition, the module and/or logic may provide for selection of additional parameters associated with the data collection conditions that further define conditions for the action.

At Event 420, a determination is made if any actions are associated with the condition. In some aspects, the condition itself may serve as the task, in which, case no actions are associated with the condition. If no action or actions are associated with the condition, the process will proceed to Event 440 and an assessment of further conditions is made.

If the condition does have an associated action or actions, then at Event 430, once the condition has been selected the module and/or logic provides for the selection of one or more actions, such as data collection actions. Data collection actions define what data is to be collected when the condition is satisfied. Examples of data collection actions include, but are not limited to, collecting log data, collecting event data, collecting request-and-response data and the like. In addition to providing for selection of actions, the module and/or logic may provide for selection of additional parameters associated with the actions that further define the action.

At Decision 440, a determination is made as to whether further conditions are to be selected. Typically, further condition selections are dictated by the need to perform further actions, such as multiple data collection actions. If further condition selections are warranted, the process returns to Event 410 for further selection.

If all conditions and associated actions have been selected, then at Event 450, a configuration message is generated. In many aspects, the structure of the message will include static structure that includes parameters relevant to the application and custom configurable structure that is variable in length and includes the conditions and actions. In some aspects, the configuration message will map conditions to one or more action IDs and the action IDs will map to a listing of action blocks that include the action parameters.

At Event 460, once the configuration message has been generated it is communicated to one or more wireless devices that receive the message, determine data collection configuration and execute data collection according to the determined configuration. While in many aspects the configuration message is communicated wirelessly, it is also possible to communicate the configuration message through a wired medium, if the wireless device supports both wireless and wired communication.

Figure 16:
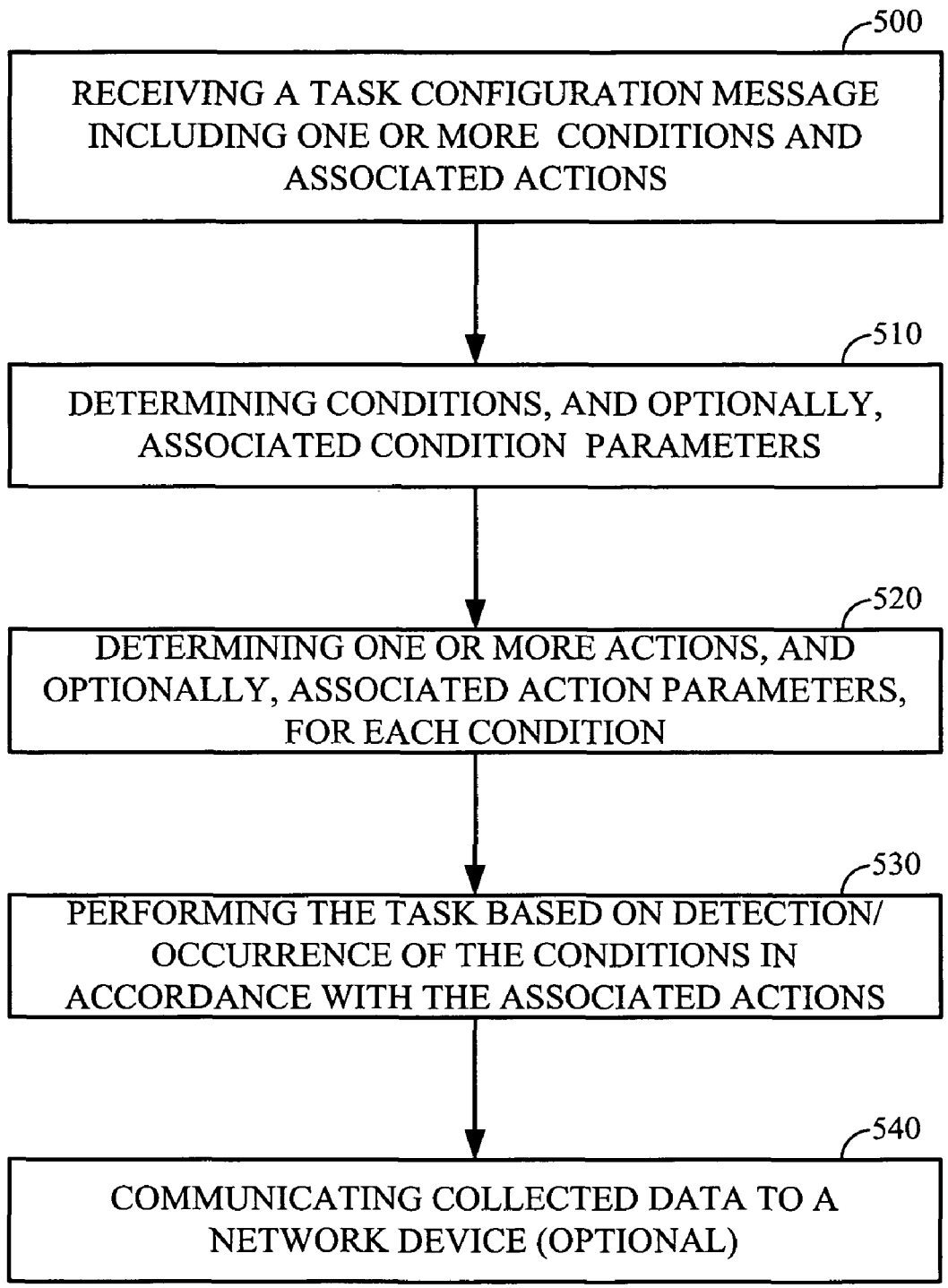
FIG. 16 is a flow diagram of a method for providing configured data collection at a wireless device, according to one aspect.

Referring to FIG. 16, according to one aspect, a flow diagram of a method for providing configurable data collection on a wireless device is presented. At Event 500, a wireless device receives a task configuration message. The message includes one or more task conditions, such as data collection conditions or the like. Additionally, each task condition will typically have one or more associated actions that define the action, such as data collection, that is to take place once the condition is met. Examples of data collection actions include, but are not limited to collecting log data, collecting event data, collecting request-and-response data and the like.

At Event 510, an executable module and/or logic within the mobile device will parse the configuration message to determine the one or more conditions and any parameters associated with the conditions. At Event 520, the executable module and/or logic will further parse the configuration message to determine the one or more actions associated with each of conditions and any parameters associated with the actions. It should be noted that the executable module and/or logic may determine the data collection conditions and data collection actions sequentially, in parallel or in any other order.

At Event 530, once the conditions and associated actions have been determined, an executable module and/or logic within the mobile device will perform the action or actions as prescribed by the determined conditions and associated actions. In those aspects in which the action involves collection of data, the collected data will typically be stored at the wireless device in logged data format.

For example, in some aspects, Event 530 comprises the instantiation of listener agent 51 corresponding to each condition 22 and/or condition parameter 24 and/or action 28 and/or action parameters 30 parsed from configuration message 33. Each listener agent 51 monitors processing engine 35 for the occurrence of its corresponding condition 22 and/or condition parameter 24, and initiates the subsequent action 28 based on action parameters 30. For example, referring to FIG. 8, task module 36 may parse configuration message 33 and instantiate a listener agent 51 for each of event ID 267, log ID 0x4003, event ID 268 and log ID 0x4105. The listener agent 51 corresponding to event ID 267 is enabled and in communication with task module 36, thereby notifying task module 36 of the occurrence of the configured triggering event. At the same time, the other listener agents are buffering data associated with the occurrence of their respective log code IDs and event ID. In some aspects, upon receiving notification of the occurrence of event ID 267 from the corresponding listener agent, task module 36 requests the buffered data from the listener agents corresponding to log ID 0x4003, event ID 268 and log ID 0x4105. Further, the logic associated with task module 36 filters the buffered data according to the pre-occurrence and post-occurrence condition parameters, and then records the filter data into data log 78..

At optional Event 540, the collected data is communicated, typically wirelessly, to a network device. For example, data log 78 is forwarded to network device 14, such as a user manager device. In many instances, a service provider or network administrator will desire access to the collected data to monitor the performance of the network and/or the device. Communication of the collected data may occur at predetermined intervals, as the data is collected, based on the occurrence of an event occurring at the wireless device or at the bequest or the network administrator, the service provider and/or wireless device user. The data collection-configuration message may also provide configuration related to the communication of the collected data, such as how and when the collected data is to be communicated to the network device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, the described aspects provide for configurable task management, such as data collection management at a wireless device. Configurable data collection provides for data collection conditions and associated data collection actions to be configured based on the requirements of a data collection application, such as a monitoring application or the needs of a service provider. Such configurable data collection obviates the need to modify the source code of the data collection application in the instance in which data collection alteration is necessary. In addition to configuring conditions for data collection and associated collection actions, the described aspects provide for configuring the parameters associated with the conditions and actions. The configurable nature of the described data collection schemes allow users to modify data collection on-the-fly and/or dynamically.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for performing a task at a wireless communication device, comprising:
   receiving a task configuration message comprising:
      a condition list size block which identifies a size of a condition portion of the task configuration message;
      at least one condition operated to occur on the wireless communication device;
      an action list size block which identifies a size of a dynamically configured action portion of the task configuration message;
      an action list identifying a plurality of dynamically configured actions; and
      at least one corresponding action identifier operated to map at least one dynamically configured action identified in the action list to the respective condition;
   monitoring for the occurrence of each condition;
   referencing the action list based on the respective action identifier, wherein the action identifier identifies each action from a plurality of dynamically configured actions in the action list corresponding to each respective condition; and
   performing each action referenced by each action identifier corresponding to each condition based on detecting the respective condition.

2. The method of claim 1, further comprising dynamically instantiating a listener agent on the wireless communication device based on at least one of each condition and each action, wherein each listener agent is operated to perform at least one of detecting an occurrence of the respective condition and initiating the performance of each corresponding action.

3. The method of claim 1, wherein performing further comprises collecting predetermined data from a processing subsystem of the wireless communication device.

4. The method of claim 1, wherein performing further comprises collecting predetermined data from a processing subsystem of the wireless communication device based on detecting a triggering event occurring on the wireless communication device.

5. The method of claim 1, wherein performing further comprises constantly collecting predetermined data from a processing subsystem of the wireless communication device.

6. The method of claim 1, wherein performing further comprises collecting data from a predetermined log location on the wireless communication device, wherein the predetermined log location is based on an action parameter corresponding to the respective action identifier.

7. The method of claim 1, wherein performing further comprises collecting predetermined event data from a processing subsystem on the wireless communication device, wherein the predetermined event data is based on an action parameter corresponding to the respective action identifier.

8. The method of claim 1, wherein performing further comprises requesting a data packet based on a first action parameter corresponding to the respective action identifier and recording at least a portion of the data packet based on a second action parameter corresponding to the respective action identifier.

9. The method of claim 1, wherein performing further comprises at least one of disabling the device, disabling a device component, providing for limited device use, executing an application on the device, and executing a component on the device.

10. The method of claim 1, wherein performing further comprises monitoring for each condition based on at least one condition parameter.

11. The method of claim 1, wherein monitoring for each condition based on at least one condition parameter further comprises monitoring for each condition based on at least one condition parameter chosen from the group consisting of condition priority, condition overflow, condition buffer size, condition buffer limit, condition threshold, collection interval, and payload match criteria.

12. The method of claim 1, wherein receiving further comprises receiving the task configuration message comprising at least one dynamically configured condition operated to occur on the wireless communication device and at least one dynamically configured corresponding action identifier.

13. The method of claim 1, wherein performing further comprises performing each action referenced by each action identifier according to at least one action parameter chosen from the group consisting of a primary action priority, an alternative action priority, an action overflow, an action buffer size, an action buffer limit, an action threshold, an payload match criteria and additional action logic.

14. A tangible computer-readable storage medium having stored thereon processor-executable instructions configured to cause a processor to perform operations comprising:
receiving a task configuration message comprising:
a condition list size block which identifies a size of a condition portion of the task configuration message;
at least one condition operated to occur on the wireless communication device;
an action list size block which identifies a size of a dynamically configured action portion of the task configuration message;
an action list identifying a plurality of dynamically configured actions; and
at least one corresponding action identifier operated to map at least one dynamically configured action identified in the action list to the respective condition;
monitoring for the occurrence of each condition;
referencing the action list based on the respective action identifier, wherein the action identifier identifies each action from a plurality of dynamically configured actions in the action list corresponding to each respective condition; and
performing each action referenced by each action identifier corresponding to each condition based on detecting the respective condition.

15. At least one processor device, implemented in a wireless communication device, configured to perform the operations of:
receiving a task configuration message comprising:
a condition list size block which identifies a size of a condition portion of the task configuration message;
at least one condition operated to occur on the wireless communication device;
an action list size block which identifies a size of a dynamically configured action portion of the task configuration message;
an action list identifying a plurality of dynamically configured actions; and
at least one corresponding action identifier operated to map at least one dynamically configured action identified in the action list to the respective condition;
monitoring for the occurrence of each condition;
referencing the action list based on the respective action identifier, wherein the action identifier identifies each action from a plurality of dynamically configured actions in the action list corresponding to each respective condition; and
performing each action referenced by each action identifier corresponding to each condition based on detecting the respective condition.

16. A wireless communication device adapted to perform configurable tasks, comprising:
a communications module configured to receive a task configuration message comprising:
a condition list size block which identifies a size of a condition portion of the task configuration message;
at least one condition operated to occur on the wireless communication device;
an action list size block which identifies a size of a dynamically configured action portion of the task configuration message;
an action list identifying a plurality of dynamically configured actions; and
at least one corresponding action identifier operated to map at least one dynamically configured action identified in the action list to the respective condition;
monitoring for the occurrence of each condition;
a processing engine configured to reference the action list based on the respective action identifier, wherein the action identifier identifies each action from a plurality of dynamically configured actions in the action list corresponding to each respective condition; and
a task module in communication with the communications module and configured to perform each action referenced by each action identifier corresponding to each condition based on detecting the respective condition.

17. The wireless communication device of claim 15, further comprising a listener agent dynamically instantiated on the wireless communications device based on at least one of each condition and each action, wherein each listener agent is operated to perform at least one of detecting an occurrence of the respective condition and initiating the performance of each corresponding action.

18. The wireless communication device of claim 16, wherein the task module comprises a data collection module operated to collect predetermined data from a processing subsystem of the wireless communication device according to on an action parameter corresponding to the action identifier.

19. The wireless communication device of claim 16, wherein the task module comprises a data collection module, wherein the at least one condition comprises detecting a triggering event, and wherein the at least one action comprises collecting predetermined data from a processing subsystem of the wireless communication device.

20. The wireless communication device of claim 16, wherein the task module comprises a data collection module, wherein the at least one condition comprises a constant condition, and wherein the at least one action comprises collecting predetermined data from a processing subsystem of the wireless communication device, wherein the predetermined data is based on a collection parameter corresponding to the action identifier.

21. The wireless communication device of claim 16, wherein the task module comprises a data collection module, and wherein the at least one action comprises collecting predetermined data from a predetermined log location on the wireless communication device, wherein the predetermined log location is based on an action parameter corresponding to the respective action identifier.

22. The wireless communication device of claim 16, wherein the task module comprises a data collection module, and wherein the at least one action comprises collecting predetermined event data from a processing subsystem on the wireless communication device, wherein the predetermined event data is based on an action parameter corresponding to the respective action identifier.

23. The wireless communication device of claim 16, wherein the task module comprises a data collection module operated to request a data packet based on a first action parameter corresponding to the respective action identifier and record at least a portion of the data packet based on a second action parameter corresponding to the respective action identifier.

24. The wireless communication device of claim 16, wherein the at least one action comprises at least one of disabling the device, disabling a device component, providing for limited device use, executing an application on the device, and executing a component on the device based on an action parameter corresponding to the action identifier.

25. A wireless communication device, comprising:
means for receiving a task configuration message comprising:
a condition list size block which identifies a size of a condition portion of the task configuration message;
at least one condition operated to occur on the wireless communication device;
an action list size block which identifies a size of a dynamically configured action portion of the task configuration message;
an action list identifying a plurality of dynamically configured actions; and
at least one corresponding action identifier operated to map at least one dynamically configured action identified in the action list to the respective condition;
means for monitoring for the occurrence of each condition;
means for referencing the action list based on the respective action identifier, wherein the action identifier identifies each action from a plurality of dynamically configured actions in the action list corresponding to each respective condition; and
means for performing each action referenced by each action identifier corresponding to each condition based on detecting the respective condition.

26. A method for task configuration, comprising:
selecting one or more conditions operated to occur at a wireless communication device and at least one action associated with each condition;
generating a task configuration message comprising a condition list size block which identifies a size of a condition portion of the task configuration message, the selected conditions, an action list size block which identifies a size of a dynamically configured portion of the task configuration message, an action list identifying a plurality of dynamically configured actions, and at least one corresponding action identifier operated to map at least one dynamically configured action identified in the action list to the respective condition; and
communicating the task configuration message to one or more wireless devices, wherein at least one wireless device is operated to receive the task configuration message and perform each action referenced by each action identifier corresponding to each condition based on detecting the respective condition.

27. The method of claim 26, wherein communication the task configuration message comprises initiating a dynamic instantiation of a listener agent on the wireless communication device based on at least one of each condition and each action, wherein each listener agent is operable to perform at least one of detecting an occurrence of the respective condition and initiating the performance of each corresponding action.

28. The method of claim 26, wherein selecting one or more conditions operable to occur at a wireless communication device and at least one action associated with each condition further comprises selecting one or more data collection conditions operable to occur at a wireless communication device and at least one data collection action associated with each data collection condition.

29. The method of claim 26, wherein selecting one or more conditions operable to occur at a wireless communication device and at least one action associated with each condition further defines one of conditions as a triggering event condition.

30. The method of claim 26, wherein selecting one or more conditions operable to occur at a wireless communication device and at least one action associated with each condition further defines one of conditions as a constant event condition.

31. The method of claim 26, wherein selecting one or more conditions operable to occur at a wireless communication device and at least one action associated with each condition further defines one of the actions as a log data collection action.

32. The method of claim 26, wherein selecting one or more conditions operable to occur at a wireless communication device and at least one action associated with each condition further defines one of the actions as an event data collection action.

33. The method of claim 26, wherein selecting one or more conditions operable to occur at a wireless communication device and at least one action associated with each condition further defines one of the actions as a data packet request action.

34. A tangible computer-readable storage medium having stored thereon processor-executable instructions configured to cause a processor to perform operations comprising:
selecting one or more conditions operated to occur at a wireless communication device and at least one action associated with each condition;
generating a task configuration message comprising a condition list size block which identifies a size of a condition portion of the task configuration message, the selected conditions, an action list size block which identifies a size of a dynamically configured portion of the task configuration message, an action list identifying a plurality of dynamically configured actions, and at least one corresponding action identifier operated to map at least one dynamically configured action identified in the action list to the respective condition; and
communicating the task configuration message to one or more wireless devices, wherein at least one wireless device is operated to receive the task configuration message and perform each action referenced by each action identifier corresponding to each condition based on detecting the respective condition.

35. At least one processor device, implemented in a network device, configured to perform the operations of:
  selecting one or more conditions operated to occur at a wireless communication device and at least one action associated with each condition;
  generating a task configuration message comprising a condition list size block which identifies a size of a condition portion of the task configuration message, the selected conditions, an action list size block which identifies a size of a dynamically configured portion of the task configuration message, an action list identifying a plurality of dynamically configured actions, and at least one corresponding action identifier operated to map at least one dynamically configured action identified in the action list to the respective condition; and
  communicating the task configuration message to one or more wireless devices, wherein at least one wireless device is operated to receive the task configuration message and perform each action referenced by each action identifier corresponding to each condition based on detecting the respective condition.

36. A network device for configuring data collection on a wireless device, comprising:
  a task configuration module operated to receive identification of at least one condition operated to occur on a wireless communication device and at least one action associated with each condition, the task configuration module further operated to generate a task configuration message comprising a condition list size block which identifies a size of a condition portion of the task configuration message, the at least one condition, an action list size block which identifies a size of a dynamically configured action portion of the task configuration message,
  an action list identifying a plurality of dynamically configured actions including the at least one action associated with each condition, and at least one action identifier associated with the at least one condition, wherein each action identifier is operated to map the respective dynamically configured action identified in the action list to the respective at least one condition specified in the message; and
  a communications module operated to communicate the task configuration message to one or more wireless devices.

37. The network device of claim 36, wherein the task configuration message is operated on each wireless device to dynamically instantiate a listener agent based on at least one of each condition and each action,
  wherein each listener agent is operated to perform at least one of detecting an occurrence of the respective condition and initiating the performance of each corresponding action.

38. The network device of claim 36, wherein the task configuration module further defines one of the conditions as a data collection condition and one of the actions as a data collection action.

39. The network device of claim 36, wherein the task configuration module operable to selecting one or more conditions operable to occur at a wireless communication device and at least one action associated with each condition further defines one of the conditions as a triggering event condition.

40. The network device of claim 36, wherein the task configuration module operable to selecting one or more conditions operable to occur at a wireless communication device and at least one action associated with each condition further defines one of the conditions as a constant event condition.

41. The network device of claim 36, wherein the task configuration module operated to selecting one or more conditions operated to occur at a wireless communication device and at least one action associated with each condition further defines one of the events as a log data collection action.

42. The network device of claim 36, wherein the task configuration module operated to selecting one or more conditions operated to occur at a wireless communication device and at least one action associated with each condition further defines one of the events as a event data collection action.

43. The network device of claim 36, wherein the task configuration module operated to selecting one or more conditions operated to occur at a wireless communication device and at least one action associated with each condition further defines one of the events as a data packet request collection action.

44. A network device for configuring a task on a wireless device, comprising:
  means for selecting one or more conditions operated to occur at a wireless communication device and at least one action associated with each condition;
  means for generating a task configuration message comprising a condition list size block which identifies a size of a condition portion of the task configuration message, the selected conditions, an action list size block which identifies a size of a dynamically configured action portion of the task configuration message, an action list identifying a plurality of dynamically configured actions, and at least one corresponding action identifier operated to map at least one dynamically configured action identified in the action list to the respective condition; and means for communicating the task configuration message to one or more wireless devices, wherein at least one wireless device is operated to receive the task configuration message and perform each action referenced by each action identifier corresponding to each condition based on detecting the respective condition.

* * * * *